US012217765B2

(12) United States Patent
Giacobello

(10) Patent No.: US 12,217,765 B2
(45) Date of Patent: *Feb. 4, 2025

(54) ROBUST SHORT-TIME FOURIER TRANSFORM ACOUSTIC ECHO CANCELLATION DURING AUDIO PLAYBACK

(71) Applicant: Sonos, Inc., Santa Barbara, CA (US)

(72) Inventor: Daniele Giacobello, Los Angeles, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,013

(22) Filed: May 5, 2023

(65) Prior Publication Data

US 2023/0395088 A1 Dec. 7, 2023

Related U.S. Application Data

(63) Continuation of application No. 17/327,911, filed on May 24, 2021, now Pat. No. 11,646,045, which is a
(Continued)

(51) Int. Cl.
    *G10L 21/02* (2013.01)
    *G10K 11/178* (2006.01)
    (Continued)

(52) U.S. Cl.
    CPC ............ *G10L 21/02* (2013.01); *G10K 11/178* (2013.01); *G10L 21/0208* (2013.01);
    (Continued)

(58) Field of Classification Search
    CPC . G10L 21/02; G10L 21/0208; G10L 21/0232; G10L 2021/02087; G10L 15/22;
    (Continued)

(56) References Cited

U.S. PATENT DOCUMENTS

| 999,715 A | 8/1911 | Gundersen |
| 5,717,768 A * | 2/1998 | Laroche .................. H04B 3/23 |
| | | 379/406.13 |

(Continued)

FOREIGN PATENT DOCUMENTS

| CN | 1748250 A | 3/2006 |
| CN | 1781291 A | 5/2006 |

(Continued)

OTHER PUBLICATIONS

Advisory Action mailed on Dec. 13, 2023, issued in connection with U.S. Appl. No. 18/048,034, filed Oct. 20, 2022, 4 pages.
(Continued)

*Primary Examiner* — Leshui Zhang
(74) *Attorney, Agent, or Firm* — FORTEM IP LLP

(57) ABSTRACT

Example techniques involve noise-robust acoustic echo cancellation. An example implementation may involve causing one or more speakers of the playback device to play back audio content and while the audio content is playing back, capturing, via the one or more microphones, audio within an acoustic environment that includes the audio playback. The example implementation may involve determining measured and reference signals in the STFT domain. During each $n^{th}$ iteration of an acoustic echo canceller (AEC): the implementation may involve determining a frame of an output signal by generating a frame of a model signal by passing a frame of the reference signal through an instance of an adaptive filter and then redacting the $n^{th}$ frame of the model signal from an $n^{th}$ frame of the measured signal. The implementation may further involve determining an instance of the adaptive filter for a next iteration of the AEC.

20 Claims, 9 Drawing Sheets

Related U.S. Application Data continuation of application No. 16/600,644, filed on Oct. 14, 2019, now Pat. No. 11,017,789, which is a continuation of application No. 15/717,621, filed on Sep. 27, 2017, now Pat. No. 10,446,165.

(51) Int. Cl.

| | |
|---|---|
| *G10L 21/0208* | (2013.01) |
| *G10L 21/0232* | (2013.01) |
| *H04M 9/08* | (2006.01) |
| *H04R 3/00* | (2006.01) |
| *H04R 3/12* | (2006.01) |
| *H04R 27/00* | (2006.01) |
| *H04R 29/00* | (2006.01) |

(52) U.S. Cl.
CPC .... *H04M 9/082* (2013.01); *G10K 2210/3012* (2013.01); *G10K 2210/3028* (2013.01); *G10K 2210/505* (2013.01); *G10L 2021/02087* (2013.01); *G10L 21/0232* (2013.01); *H04R 3/005* (2013.01); *H04R 3/12* (2013.01); *H04R 27/00* (2013.01); *H04R 29/007* (2013.01); *H04R 2227/003* (2013.01); *H04R 2227/005* (2013.01); *H04R 2420/03* (2013.01); *H04R 2420/07* (2013.01); *H04R 2430/23* (2013.01)

(58) Field of Classification Search
CPC .................. G10L 15/00; G10K 11/178; G10K 2210/3012; G10K 2210/3028; G10K 2210/505; H04R 3/005; H04R 3/00; H04R 3/12; H04R 27/00; H04R 29/00; H04R 29/007; H04R 2227/003; H04R 2227/005; H04R 2430/23; H04M 9/082; H04M 9/08; G06F 3/165; G06F 3/00; G06F 3/16; G06F 3/167; H03G 5/165
USPC ......... 381/17, 18, 19, 20, 21, 300, 301, 302, 381/303, 307, 119, 66, 27, 71.1–71.6, 381/71.9, 71.11, 71.12, 26, 86, 92, 381/94.1–94.9, 93, 95, 96, 97, 98–103, 381/122, 123, 74, 312–321, 77, 79, 83, 381/312–321, 309–311; 704/19.014, 704/21.002, 21.004, 21.007, 233, 278, 704/270, 272, 271; 379/406.01–406.16; 455/569.1, 570; 700/94
See application file for complete search history.

(56) References Cited

U.S. PATENT DOCUMENTS

| | | | |
|---|---|---|---|
| 5,857,172 A | 1/1999 | Rozak | |
| 6,070,140 A | 5/2000 | Tran | |
| 6,219,645 B1 | 4/2001 | Byers | |
| 7,516,068 B1 | 4/2009 | Clark | |
| 8,325,909 B2* | 12/2012 | Tashev | H04M 9/082 |
| | | | 379/406.05 |
| 8,385,557 B2* | 2/2013 | Tashev | H04R 3/005 |
| | | | 379/406.01 |
| 8,473,618 B2 | 6/2013 | Spear et al. | |
| 8,489,398 B1 | 7/2013 | Gruenstein | |
| 8,594,320 B2* | 11/2013 | Faller | H03G 9/005 |
| | | | 379/406.01 |
| 8,620,232 B2* | 12/2013 | Helsloot | H04M 9/085 |
| | | | 455/114.1 |
| 8,639,214 B1 | 1/2014 | Fujisaki | |
| 8,676,273 B1 | 3/2014 | Fujisaki | |
| 8,719,039 B1 | 5/2014 | Sharifi | |
| 8,762,156 B2 | 6/2014 | Chen | |
| 8,768,712 B1 | 7/2014 | Sharifi | |
| 8,798,995 B1 | 8/2014 | Edara | |
| 8,898,063 B1 | 11/2014 | Sykes et al. | |
| 9,002,024 B2* | 4/2015 | Nakadai | H04R 3/04 |
| | | | 381/63 |
| 9,047,857 B1 | 6/2015 | Barton | |
| 9,070,367 B1 | 6/2015 | Hoffmeister et al. | |
| 9,088,336 B2* | 7/2015 | Mani | H04M 3/002 |
| 9,183,845 B1 | 11/2015 | Gopalakrishnan et al. | |
| 9,275,637 B1 | 3/2016 | Salvador et al. | |
| 9,313,317 B1 | 4/2016 | Lebeau et al. | |
| 9,361,885 B2 | 6/2016 | Ganong, III et al. | |
| 9,390,708 B1 | 7/2016 | Hoffmeister | |
| 9,443,527 B1 | 9/2016 | Watanabe et al. | |
| 9,491,033 B1 | 11/2016 | Soyannwo et al. | |
| 9,514,747 B1 | 12/2016 | Bisani et al. | |
| 9,532,139 B1 | 12/2016 | Lu et al. | |
| 9,542,941 B1 | 1/2017 | Weksler et al. | |
| 9,672,812 B1 | 6/2017 | Watanabe et al. | |
| 9,691,378 B1 | 6/2017 | Meyers et al. | |
| 9,691,384 B1 | 6/2017 | Wang et al. | |
| 9,756,422 B2 | 9/2017 | Paquier et al. | |
| 9,779,732 B2 | 10/2017 | Lee et al. | |
| 9,779,734 B2 | 10/2017 | Lee | |
| 9,781,532 B2 | 10/2017 | Sheen | |
| 9,799,330 B2 | 10/2017 | Nemala et al. | |
| 9,805,733 B2 | 10/2017 | Park | |
| 9,875,740 B1 | 1/2018 | Kumar et al. | |
| 9,916,839 B1 | 3/2018 | Scalise et al. | |
| 9,992,642 B1 | 6/2018 | Rapp et al. | |
| 9,997,151 B1* | 6/2018 | Ayrapetian | G10L 21/0208 |
| 10,028,069 B1* | 7/2018 | Lang | H04S 7/302 |
| 10,038,419 B1 | 7/2018 | Elliot et al. | |
| 10,089,981 B1 | 10/2018 | Elangovan et al. | |
| 10,108,393 B2 | 10/2018 | Millington et al. | |
| 10,127,908 B1 | 11/2018 | Deller et al. | |
| 10,134,388 B1 | 11/2018 | Lilly | |
| 10,134,399 B2 | 11/2018 | Lang et al. | |
| 10,152,969 B2 | 12/2018 | Reilly et al. | |
| 10,157,042 B1 | 12/2018 | Jayakumar et al. | |
| 10,186,266 B1 | 1/2019 | Devaraj et al. | |
| 10,204,624 B1 | 2/2019 | Knudson et al. | |
| 10,229,680 B1 | 3/2019 | Gillespie et al. | |
| 10,249,205 B2 | 4/2019 | Hammersley et al. | |
| 10,304,440 B1 | 5/2019 | Panchapagesan et al. | |
| 10,304,475 B1 | 5/2019 | Wang et al. | |
| 10,318,236 B1 | 6/2019 | Pal et al. | |
| 10,332,508 B1 | 6/2019 | Hoffmeister | |
| 10,339,957 B1 | 7/2019 | Chenier et al. | |
| 10,354,658 B2 | 7/2019 | Wilberding | |
| 10,365,887 B1 | 7/2019 | Mulherkar | |
| 10,433,058 B1 | 10/2019 | Torgerson et al. | |
| 10,445,365 B2 | 10/2019 | Luke et al. | |
| 10,510,340 B1 | 12/2019 | Fu et al. | |
| 10,515,625 B1 | 12/2019 | Metallinou et al. | |
| 10,565,999 B2 | 1/2020 | Wilberding | |
| 10,565,998 B2 | 2/2020 | Wilberding | |
| 10,567,515 B1 | 2/2020 | Bao | |
| 10,573,312 B1 | 2/2020 | Thomson et al. | |
| 10,573,321 B1 | 2/2020 | Smith et al. | |
| 10,586,534 B1 | 3/2020 | Argyropoulos et al. | |
| 10,599,287 B2 | 3/2020 | Kumar et al. | |
| 10,600,406 B1 | 3/2020 | Shapiro et al. | |
| 10,602,268 B1 | 3/2020 | Soto | |
| 10,623,811 B1 | 4/2020 | Cwik | |
| 10,643,609 B1 | 5/2020 | Pogue et al. | |
| 10,685,669 B1 | 6/2020 | Lan et al. | |
| 10,706,843 B1 | 7/2020 | Elangovan et al. | |
| 10,720,173 B2 | 7/2020 | Freeman et al. | |
| 10,728,196 B2 | 7/2020 | Wang | |
| 10,735,870 B2 | 8/2020 | Ballande et al. | |
| 10,746,840 B1 | 8/2020 | Barton et al. | |
| 10,777,189 B1 | 9/2020 | Fu et al. | |
| 10,789,041 B2 | 9/2020 | Kim et al. | |
| 10,847,137 B1 | 11/2020 | Mandal et al. | |
| 10,847,149 B1 | 11/2020 | Mok et al. | |
| 10,847,164 B2 | 11/2020 | Wilberding | |
| 10,867,596 B2 | 12/2020 | Yoneda et al. | |
| 10,871,943 B1 | 12/2020 | D'Amato | |
| 10,878,811 B2 | 12/2020 | Smith et al. | |
| 10,878,826 B2 | 12/2020 | Li et al. | |
| 10,885,091 B1 | 1/2021 | Meng et al. | |

(56) References Cited

U.S. PATENT DOCUMENTS

| | | |
|---|---|---|
| 11,025,569 B2 | 6/2021 | Lind et al. |
| 11,062,705 B2 | 7/2021 | Watanabe et al. |
| 11,137,979 B2 | 10/2021 | Plagge |
| 11,138,969 B2 | 10/2021 | D'Amato |
| 11,159,878 B1 | 10/2021 | Chatlani et al. |
| 11,175,880 B2 | 11/2021 | Liu et al. |
| 11,184,969 B2 | 11/2021 | Lang |
| 11,189,284 B2 | 11/2021 | Maeng |
| 11,354,092 B2 | 6/2022 | D'Amato |
| 11,361,763 B1 | 6/2022 | Maas et al. |
| 11,373,645 B1 | 6/2022 | Mathew et al. |
| 11,475,899 B2 | 10/2022 | Lesso |
| 11,531,520 B2 | 11/2022 | Wilberding |
| 11,580,969 B2 | 2/2023 | Han et al. |
| 11,646,023 B2 | 5/2023 | Smith |
| 11,664,023 B2 | 5/2023 | Reilly |
| 11,694,689 B2 | 7/2023 | Smith |
| 11,709,653 B1 | 7/2023 | Shin |
| 11,714,600 B2 | 8/2023 | D'Amato |
| 11,727,936 B2 | 8/2023 | Smith |
| 11,790,937 B2 | 10/2023 | Smith et al. |
| 11,817,076 B2 | 11/2023 | Sereshki et al. |
| 2001/0003173 A1 | 6/2001 | Lim |
| 2002/0054685 A1* | 5/2002 | Avendano ............ H04M 9/082 379/406.01 |
| 2002/0055950 A1 | 5/2002 | Witteman |
| 2002/0143532 A1 | 10/2002 | McLEAN et al. |
| 2003/0097482 A1 | 5/2003 | DeHART et al. |
| 2004/0128135 A1 | 7/2004 | Anastasakos et al. |
| 2004/0153321 A1 | 8/2004 | Chung et al. |
| 2006/0104454 A1 | 5/2006 | Guitarte Perez et al. |
| 2007/0038461 A1 | 2/2007 | Abbott et al. |
| 2008/0160977 A1 | 7/2008 | Ahmaniemi et al. |
| 2008/0192946 A1* | 8/2008 | Faller ................. H04M 9/082 381/66 |
| 2008/0248797 A1 | 10/2008 | Freeman et al. |
| 2008/0291916 A1 | 11/2008 | Xiong et al. |
| 2009/0013255 A1 | 1/2009 | Yuschik et al. |
| 2009/0113053 A1 | 4/2009 | Van Wie et al. |
| 2009/0214048 A1* | 8/2009 | Stokes, III ............... H04B 3/23 381/66 |
| 2009/0220107 A1 | 9/2009 | Every et al. |
| 2009/0299745 A1 | 12/2009 | Kennewick et al. |
| 2009/0323907 A1 | 12/2009 | Gupta et al. |
| 2009/0323924 A1* | 12/2009 | Tashev ................. H04M 9/082 379/406.05 |
| 2010/0070276 A1 | 3/2010 | Wasserblat et al. |
| 2010/0179806 A1 | 7/2010 | Zhang et al. |
| 2010/0329472 A1* | 12/2010 | Nakadai ................ H04M 9/082 381/66 |
| 2011/0019833 A1* | 1/2011 | Kuech .................. H04M 9/082 381/66 |
| 2011/0044461 A1* | 2/2011 | Kuech .................. H04M 9/082 381/104 |
| 2011/0046952 A1 | 2/2011 | Koshinaka |
| 2011/0131032 A1 | 6/2011 | Yang, II et al. |
| 2011/0176687 A1* | 7/2011 | Birkenes ............... H04M 9/085 381/66 |
| 2011/0267985 A1 | 11/2011 | Wilkinson et al. |
| 2012/0009906 A1 | 1/2012 | Patterson et al. |
| 2012/0027218 A1* | 2/2012 | Every ................. H04R 3/002 381/66 |
| 2012/0076308 A1* | 3/2012 | Kuech .................. H04R 3/02 381/66 |
| 2012/0224457 A1 | 9/2012 | Kim et al. |
| 2012/0237047 A1* | 9/2012 | Neal .................... H04M 9/082 381/66 |
| 2012/0265528 A1 | 10/2012 | Gruber et al. |
| 2013/0073293 A1 | 3/2013 | Jang et al. |
| 2013/0080146 A1 | 3/2013 | Kato et al. |
| 2013/0080167 A1 | 3/2013 | Mozer |
| 2013/0080171 A1 | 3/2013 | Mozer et al. |
| 2013/0129100 A1* | 5/2013 | Sorensen ................ H04R 3/02 381/66 |
| 2013/0185639 A1 | 7/2013 | Lim |
| 2013/0230184 A1* | 9/2013 | Kuech .................. H04M 9/085 381/66 |
| 2013/0238326 A1 | 9/2013 | Kim et al. |
| 2013/0283169 A1 | 10/2013 | Van Wie |
| 2013/0289994 A1 | 10/2013 | Newman et al. |
| 2013/0294611 A1* | 11/2013 | Yoo .................. G10L 21/028 381/66 |
| 2013/0301840 A1* | 11/2013 | Yemdji ................ H04M 9/082 381/66 |
| 2013/0322634 A1 | 12/2013 | Bennett et al. |
| 2013/0336499 A1* | 12/2013 | Beckhardt ........... H04L 12/2838 381/81 |
| 2013/0339028 A1 | 12/2013 | Rosner et al. |
| 2014/0056435 A1* | 2/2014 | Kjems .................... G10L 15/20 381/317 |
| 2014/0064476 A1* | 3/2014 | Mani .................... H04M 3/002 379/406.08 |
| 2014/0122092 A1* | 5/2014 | Goldstein .............. G06F 3/165 704/275 |
| 2014/0126745 A1* | 5/2014 | Dickins ............... G10L 21/0208 381/94.3 |
| 2014/0149118 A1 | 5/2014 | Lee et al. |
| 2014/0159581 A1 | 6/2014 | Pruemmer et al. |
| 2014/0161263 A1 | 6/2014 | Koishida et al. |
| 2014/0167929 A1 | 6/2014 | Shim et al. |
| 2014/0181199 A1 | 6/2014 | Kumar et al. |
| 2014/0188476 A1 | 7/2014 | Li et al. |
| 2014/0244269 A1 | 8/2014 | Tokutake |
| 2014/0253676 A1 | 9/2014 | Nagase et al. |
| 2014/0270216 A1* | 9/2014 | Tsilfidis ................ H04R 3/002 381/66 |
| 2014/0274203 A1 | 9/2014 | Ganong, III et al. |
| 2014/0278343 A1 | 9/2014 | Tran |
| 2014/0278372 A1 | 9/2014 | Nakadai et al. |
| 2014/0278933 A1 | 9/2014 | McMillan |
| 2014/0303969 A1 | 10/2014 | Inose et al. |
| 2014/0334645 A1 | 11/2014 | Yun et al. |
| 2014/0358535 A1 | 12/2014 | Lee et al. |
| 2014/0364089 A1 | 12/2014 | Lienhart et al. |
| 2014/0365225 A1 | 12/2014 | Haiut |
| 2014/0368734 A1 | 12/2014 | Hoffert et al. |
| 2015/0006184 A1 | 1/2015 | Marti et al. |
| 2015/0032443 A1 | 1/2015 | Karov et al. |
| 2015/0032456 A1 | 1/2015 | Wait |
| 2015/0039310 A1 | 2/2015 | Clark et al. |
| 2015/0039311 A1 | 2/2015 | Clark et al. |
| 2015/0039317 A1 | 2/2015 | Klein et al. |
| 2015/0058018 A1 | 2/2015 | Georges et al. |
| 2015/0073807 A1 | 3/2015 | Kumar |
| 2015/0112672 A1* | 4/2015 | Giacobello ........... H04M 9/082 704/233 |
| 2015/0126255 A1* | 5/2015 | Yang .................. G10L 21/0208 455/570 |
| 2015/0154953 A1 | 6/2015 | Bapat et al. |
| 2015/0154954 A1 | 6/2015 | Sharifi |
| 2015/0200923 A1 | 7/2015 | Triplett |
| 2015/0215382 A1 | 7/2015 | Arora et al. |
| 2015/0221307 A1 | 8/2015 | Shah et al. |
| 2015/0248885 A1 | 9/2015 | Koulomzin |
| 2015/0279351 A1 | 10/2015 | Nguyen et al. |
| 2015/0355878 A1 | 12/2015 | Corbin |
| 2015/0356968 A1 | 12/2015 | Rice et al. |
| 2015/0373100 A1 | 12/2015 | Kravets et al. |
| 2015/0380010 A1 | 12/2015 | Srinivasan |
| 2015/0382047 A1 | 12/2015 | Van Os et al. |
| 2015/0382128 A1 | 12/2015 | Ridihalgh et al. |
| 2016/0014536 A1 | 1/2016 | Sheen |
| 2016/0027440 A1 | 1/2016 | Gelfenbeyn et al. |
| 2016/0034448 A1 | 2/2016 | Tran |
| 2016/0050488 A1 | 2/2016 | Matheja et al. |
| 2016/0055847 A1 | 2/2016 | Dahan |
| 2016/0055850 A1 | 2/2016 | Nakadai et al. |
| 2016/0066087 A1* | 3/2016 | Solbach ............... G10L 21/0232 381/71.1 |
| 2016/0070526 A1 | 3/2016 | Sheen |
| 2016/0093281 A1* | 3/2016 | Kuo ................. G10K 11/17885 381/71.1 |

(56) References Cited

U.S. PATENT DOCUMENTS

| | | |
|---|---|---|
| 2016/0118048 A1 | 4/2016 | Heide |
| 2016/0133259 A1 | 5/2016 | Rubin et al. |
| 2016/0134924 A1 | 5/2016 | Bush et al. |
| 2016/0140957 A1 | 5/2016 | Duta et al. |
| 2016/0148612 A1 | 5/2016 | Guo et al. |
| 2016/0148615 A1 | 5/2016 | Lee et al. |
| 2016/0189716 A1 | 6/2016 | Lindahl et al. |
| 2016/0192099 A1 | 6/2016 | Oishi et al. |
| 2016/0212488 A1 | 7/2016 | Os et al. |
| 2016/0217789 A1 | 7/2016 | Lee et al. |
| 2016/0299737 A1 | 10/2016 | Clayton et al. |
| 2016/0335485 A1 | 11/2016 | Kim |
| 2016/0379635 A1 | 12/2016 | Page |
| 2017/0032244 A1 | 2/2017 | Kurata |
| 2017/0053648 A1 | 2/2017 | Chi |
| 2017/0053650 A1 | 2/2017 | Ogawa |
| 2017/0076720 A1 | 3/2017 | Gopalan et al. |
| 2017/0076726 A1 | 3/2017 | Bae |
| 2017/0084278 A1 | 3/2017 | Jung |
| 2017/0090864 A1 | 3/2017 | Jorgovanovic |
| 2017/0103748 A1 | 4/2017 | Weissberg et al. |
| 2017/0103755 A1 | 4/2017 | Jeon et al. |
| 2017/0110130 A1 | 4/2017 | Sharifi et al. |
| 2017/0140759 A1 | 5/2017 | Kumar et al. |
| 2017/0164139 A1 | 6/2017 | Deselaers et al. |
| 2017/0186425 A1 | 6/2017 | Dawes et al. |
| 2017/0242657 A1 | 8/2017 | Jarvis et al. |
| 2017/0245076 A1 | 8/2017 | Kusano et al. |
| 2017/0269900 A1 | 9/2017 | Triplett |
| 2017/0300289 A1 | 10/2017 | Gattis |
| 2017/0300990 A1 | 10/2017 | Tanaka et al. |
| 2017/0329397 A1 | 11/2017 | Lin |
| 2017/0332035 A1 | 11/2017 | Shah et al. |
| 2017/0357390 A1 | 12/2017 | Alonso Ruiz et al. |
| 2017/0357475 A1 | 12/2017 | Lee et al. |
| 2017/0365247 A1* | 12/2017 | Ushakov .................. H04R 3/02 |
| 2018/0012077 A1 | 1/2018 | Laska et al. |
| 2018/0033428 A1 | 2/2018 | Kim et al. |
| 2018/0033429 A1 | 2/2018 | Makke et al. |
| 2018/0061409 A1 | 3/2018 | Valentine et al. |
| 2018/0091913 A1 | 3/2018 | Hartung et al. |
| 2018/0096678 A1 | 4/2018 | Zhou et al. |
| 2018/0120947 A1 | 5/2018 | Wells et al. |
| 2018/0137857 A1 | 5/2018 | Zhou et al. |
| 2018/0139512 A1 | 5/2018 | Moran et al. |
| 2018/0182383 A1 | 6/2018 | Kim et al. |
| 2018/0182397 A1 | 6/2018 | Carbune et al. |
| 2018/0182410 A1* | 6/2018 | Kaskari .................. G10L 25/18 |
| 2018/0188948 A1 | 7/2018 | Ouyang et al. |
| 2018/0196776 A1 | 7/2018 | Hershko et al. |
| 2018/0211665 A1 | 7/2018 | Park et al. |
| 2018/0228006 A1 | 8/2018 | Baker et al. |
| 2018/0233137 A1 | 8/2018 | Torok et al. |
| 2018/0270575 A1 | 9/2018 | Akutagawa |
| 2018/0277113 A1 | 9/2018 | Hartung et al. |
| 2018/0286394 A1 | 10/2018 | Li et al. |
| 2018/0286414 A1 | 10/2018 | Ravindran et al. |
| 2018/0301147 A1 | 10/2018 | Kim |
| 2018/0330589 A1 | 11/2018 | Horling |
| 2018/0336892 A1 | 11/2018 | Kim et al. |
| 2018/0349093 A1 | 12/2018 | McCarty et al. |
| 2018/0350356 A1 | 12/2018 | Garcia |
| 2018/0350379 A1 | 12/2018 | Wung et al. |
| 2018/0352014 A1 | 12/2018 | Alsina et al. |
| 2018/0352334 A1 | 12/2018 | Family et al. |
| 2018/0358019 A1 | 12/2018 | Mont-Reynaud |
| 2019/0013019 A1 | 1/2019 | Lawrence |
| 2019/0035404 A1 | 1/2019 | Gabel et al. |
| 2019/0037173 A1 | 1/2019 | Lee |
| 2019/0043488 A1 | 2/2019 | Bocklet et al. |
| 2019/0044745 A1 | 2/2019 | Knudson et al. |
| 2019/0051298 A1 | 2/2019 | Lee et al. |
| 2019/0051299 A1 | 2/2019 | Ossowski et al. |
| 2019/0066680 A1 | 2/2019 | Woo et al. |
| 2019/0066710 A1 | 2/2019 | Bryan et al. |
| 2019/0073999 A1 | 3/2019 | Prémont et al. |
| 2019/0081810 A1 | 3/2019 | Jung |
| 2019/0087455 A1 | 3/2019 | He et al. |
| 2019/0098400 A1 | 3/2019 | Buoni et al. |
| 2019/0108839 A1 | 4/2019 | Reilly et al. |
| 2019/0122662 A1 | 4/2019 | Chang et al. |
| 2019/0130906 A1 | 5/2019 | Kobayashi et al. |
| 2019/0147860 A1 | 5/2019 | Chen et al. |
| 2019/0156847 A1 | 5/2019 | Bryan et al. |
| 2019/0172452 A1 | 6/2019 | Smith et al. |
| 2019/0172467 A1 | 6/2019 | Kim et al. |
| 2019/0172476 A1 | 6/2019 | Wung et al. |
| 2019/0182072 A1 | 6/2019 | Roe et al. |
| 2019/0186937 A1 | 6/2019 | Sharifi et al. |
| 2019/0206391 A1 | 7/2019 | Busch et al. |
| 2019/0237067 A1 | 8/2019 | Friedman et al. |
| 2019/0237089 A1 | 8/2019 | Shin |
| 2019/0244608 A1 | 8/2019 | Choi et al. |
| 2019/0259408 A1 | 8/2019 | Freeman et al. |
| 2019/0281387 A1 | 9/2019 | Woo et al. |
| 2019/0287536 A1 | 9/2019 | Sharifi et al. |
| 2019/0288970 A1 | 9/2019 | Siddiq |
| 2019/0289367 A1 | 9/2019 | Siddiq |
| 2019/0295542 A1 | 9/2019 | Huang et al. |
| 2019/0295555 A1 | 9/2019 | Wilberding |
| 2019/0295556 A1 | 9/2019 | Wilberding |
| 2019/0311715 A1 | 10/2019 | Pfeffinger et al. |
| 2019/0311718 A1 | 10/2019 | Huber et al. |
| 2019/0311722 A1 | 10/2019 | Caldwell |
| 2019/0318729 A1 | 10/2019 | Chao et al. |
| 2019/0325870 A1 | 10/2019 | Mitic |
| 2019/0325888 A1 | 10/2019 | Geng |
| 2019/0341037 A1 | 11/2019 | Bromand et al. |
| 2019/0341038 A1 | 11/2019 | Bromand et al. |
| 2019/0348044 A1 | 11/2019 | Chun et al. |
| 2019/0362714 A1 | 11/2019 | Mori et al. |
| 2019/0371324 A1 | 12/2019 | Powell et al. |
| 2019/0371329 A1 | 12/2019 | D'Souza et al. |
| 2019/0371342 A1 | 12/2019 | Tukka et al. |
| 2019/0392832 A1 | 12/2019 | Mitsui et al. |
| 2020/0007987 A1 | 1/2020 | Woo et al. |
| 2020/0043489 A1 | 2/2020 | Bradley et al. |
| 2020/0043494 A1 | 2/2020 | Maeng |
| 2020/0066279 A1 | 2/2020 | Kang et al. |
| 2020/0074990 A1 | 3/2020 | Kim et al. |
| 2020/0075018 A1 | 3/2020 | Chen |
| 2020/0090647 A1 | 3/2020 | Kurtz |
| 2020/0098354 A1 | 3/2020 | Lin et al. |
| 2020/0105245 A1 | 4/2020 | Gupta et al. |
| 2020/0105264 A1 | 4/2020 | Jang et al. |
| 2020/0135194 A1 | 4/2020 | Jeong |
| 2020/0167597 A1 | 5/2020 | Nguyen et al. |
| 2020/0211539 A1 | 7/2020 | Lee |
| 2020/0211550 A1 | 7/2020 | Pan et al. |
| 2020/0234709 A1 | 7/2020 | Kunitake |
| 2020/0244650 A1 | 7/2020 | Burris et al. |
| 2020/0265838 A1 | 8/2020 | Lee et al. |
| 2020/0265842 A1 | 8/2020 | Singh |
| 2020/0310751 A1 | 10/2020 | Anand et al. |
| 2020/0342869 A1 | 10/2020 | Lee et al. |
| 2020/0364026 A1 | 11/2020 | Lee et al. |
| 2021/0029452 A1 | 1/2021 | Tsoi et al. |
| 2021/0067867 A1 | 3/2021 | Kagoshima |
| 2021/0157542 A1 | 5/2021 | De Assis et al. |
| 2021/0166680 A1 | 6/2021 | Jung et al. |
| 2021/0183366 A1 | 6/2021 | Reinspach et al. |
| 2021/0239831 A1 | 8/2021 | Shin et al. |
| 2021/0249004 A1 | 8/2021 | Smith |
| 2021/0280185 A1 | 9/2021 | Tan et al. |
| 2021/0295849 A1 | 9/2021 | Van Der Ven et al. |
| 2021/0358481 A1 | 11/2021 | D'Amato et al. |
| 2022/0035514 A1 | 2/2022 | Shin et al. |
| 2022/0036882 A1 | 2/2022 | Ahn et al. |
| 2022/0050585 A1 | 2/2022 | Fettes et al. |
| 2022/0083136 A1 | 3/2022 | DeLeeuw |
| 2022/0301561 A1 | 9/2022 | Robert Jose et al. |
| 2023/0019595 A1 | 1/2023 | Smith |
| 2023/0215433 A1 | 7/2023 | Myers et al. |

(56) References Cited

U.S. PATENT DOCUMENTS

| | | |
|---|---|---|
| 2023/0237998 A1 | 7/2023 | Smith et al. |
| 2023/0274738 A1 | 8/2023 | Smith et al. |
| 2023/0382349 A1 | 11/2023 | Ham |

FOREIGN PATENT DOCUMENTS

| | | |
|---|---|---|
| CN | 101427154 A | 5/2009 |
| CN | 102999161 A | 3/2013 |
| CN | 104155938 A | 11/2014 |
| CN | 104572009 A | 4/2015 |
| CN | 104581510 A | 4/2015 |
| CN | 104885406 A | 9/2015 |
| CN | 104885438 A | 9/2015 |
| CN | 105101083 A | 11/2015 |
| CN | 105162886 A | 12/2015 |
| CN | 105284168 A | 1/2016 |
| CN | 105389099 A | 3/2016 |
| CN | 105427861 A | 3/2016 |
| CN | 105472191 A | 4/2016 |
| CN | 105493179 A | 4/2016 |
| CN | 105632486 A | 6/2016 |
| CN | 106030699 A | 10/2016 |
| CN | 106910500 A | 6/2017 |
| CN | 107122158 A | 9/2017 |
| CN | 107465974 A | 12/2017 |
| CN | 107644313 A | 1/2018 |
| CN | 107767863 A | 3/2018 |
| CN | 107832837 A | 3/2018 |
| CN | 107919116 A | 4/2018 |
| CN | 108198548 A | 6/2018 |
| EP | 2683147 A1 | 1/2014 |
| EP | 3133595 A1 | 2/2017 |
| EP | 3142107 A1 | 3/2017 |
| GB | 2501367 A | 10/2013 |
| JP | 2004096520 A | 3/2004 |
| JP | 2004163590 A | 6/2004 |
| JP | 2007235875 A | 9/2007 |
| JP | 2008217444 A | 9/2008 |
| JP | 2016009193 A | 1/2016 |
| JP | 2019109510 A | 7/2019 |
| KR | 20130050987 A | 5/2013 |
| KR | 101284134 B1 | 7/2013 |
| KR | 20140111859 A | 9/2014 |
| TW | 201629950 A | 8/2016 |
| WO | 2008096414 A1 | 8/2008 |
| WO | 2016014686 | 1/2016 |
| WO | 2016014686 A1 | 1/2016 |
| WO | 2016022926 A1 | 2/2016 |
| WO | 2020061439 A1 | 3/2020 |
| WO | 2020068795 A1 | 4/2020 |
| WO | 2020132298 A1 | 6/2020 |

OTHER PUBLICATIONS

Australian Patent Office, Australian Examination Report Action mailed on Jul. 11, 2023, issued in connection with Australian Application No. 2022246446, 2 pages.

Australian Patent Office, Australian Examination Report Action mailed on Jun. 14, 2023, issued in connection with Australian Application No. 2019299865, 2 pages.

Australian Patent Office, Australian Examination Report Action mailed on Sep. 25, 2023, issued in connection with Australian Application No. 2018338812, 3 pages.

Australian Patent Office, Australian Examination Report Action mailed on Oct. 31, 2023, issued in connection with Australian Application No. 2023203687, 2 pages.

Canadian Patent Office, Canadian Examination Report mailed on Oct. 12, 2023, issued in connection with Canadian Application No. 3084279, 4 pages.

Canadian Patent Office, Canadian Examination Report mailed on Dec. 19, 2023, issued in connection with Canadian Application No. 3067776, 3 pages.

Canadian Patent Office, Canadian Examination Report mailed on Jan. 3, 2024, issued in connection with Canadian Application No. 3123601, 3 pages.

Chinese Patent Office, First Office Action and Translation mailed on Feb. 9, 2023, issued in connection with Chinese Application No. 201880076788.0, 13 pages.

Chinese Patent Office, First Office Action and Translation mailed on Oct. 9, 2022, issued in connection with Chinese Application No. 201780056695.7, 10 pages.

Chinese Patent Office, First Office Action and Translation mailed on Nov. 10, 2022, issued in connection with Chinese Application No. 201980070006.7, 15 pages.

Chinese Patent Office, First Office Action and Translation mailed on Jan. 19, 2023, issued in connection with Chinese Application No. 201880064916.X, 10 pages.

Chinese Patent Office, First Office Action and Translation mailed on Nov. 25, 2022, issued in connection with Chinese Application No. 201780056321.5, 8 pages.

Chinese Patent Office, First Office Action and Translation mailed on Feb. 27, 2023, issued in connection with Chinese Application No. 201980003798.6, 12 pages.

Chinese Patent Office, First Office Action and Translation mailed on Dec. 30, 2022, issued in connection with Chinese Application No. 201880076775.3, 10 pages.

Chinese Patent Office, First Office Action and Translation mailed on Sep. 6, 2023, issued in connection with Chinese Application No. 202010179593.8, 14 pages.

Chinese Patent Office, Second Office Action and Translation mailed on Apr. 1, 2023, issued in connection with Chinese Application No. 201980056604.9, 11 pages.

Chinese Patent Office, Second Office Action mailed on Dec. 21, 2022, issued in connection with Chinese Application No. 201980089721.5, 12 pages.

Chinese Patent Office, Second Office Action mailed on May 30, 2023, issued in connection with Chinese Application No. 201980070006.7, 9 pages.

European Patent Office, European EPC Article 94.3 mailed on Jun. 5, 2023, issued in connection with European Application No. 20710649.3, 8 pages.

European Patent Office, European EPC Article 94.3 mailed on Feb. 10, 2023, issued in connection with European Application No. 19729968.8, 7 pages.

European Patent Office, European EPC Article 94.3 mailed on Jan. 10, 2024, issued in connection with European Application No. 20757152.2, 6 pages.

European Patent Office, European EPC Article 94.3 mailed on Oct. 12, 2023, issued in connection with European Application No. 20736489.4, 8 pages.

European Patent Office, European EPC Article 94.3 mailed on Dec. 18, 2023, issued in connection with European Application No. 21703134.3, 7 pages.

European Patent Office, European EPC Article 94.3 mailed on Feb. 23, 2023, issued in connection with European Application No. 19839734.1, 8 pages.

European Patent Office, European EPC Article 94.3 mailed on Jan. 24, 2024, issued in connection with European Application No. 21180778.9, 8 pages.

European Patent Office, European EPC Article 94.3 mailed on Jun. 27, 2023, issued in connection with European Application No. 21195031.6, 4 pages.

European Patent Office, European EPC Article 94.3 mailed on Nov. 27, 2023, issued in connection with European Application No. 19780508.8, 7 pages.

European Patent Office, European EPC Article 94.3 mailed on Nov. 28, 2022, issued in connection with European Application No. 18789515.6, 7 pages.

European Patent Office, European EPC Article 94.3 mailed on Nov. 28, 2023, issued in connection with European Application No. 19731415.6, 9 pages.

European Patent Office, European EPC Article 94.3 mailed on Mar. 29, 2023, issued in connection with European Application No. 22182193.7, 4 pages.

(56) References Cited

OTHER PUBLICATIONS

European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Jan. 2, 2024, issued in connection with European Application No. 23188226.7, 10 pages.
European Patent Office, European Search Report mailed on Sep. 21, 2023, issued in connection with European Application No. 23172783.5, 8 pages.
Final Office Action mailed on May 17, 2023, issued in connection with U.S. Appl. No. 16/168,389, filed Oct. 23, 2018, 44 pages.
Final Office Action mailed on Aug. 22, 2023, issued in connection with U.S. Appl. No. 18/061,570, filed Dec. 5, 2022, 12 pages.
Final Office Action mailed on Aug. 25, 2023, issued in connection with U.S. Appl. No. 16/989,350, filed Aug. 10, 2020, 21 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Oct. 6, 2023, issued in connection with U.S. Appl. No. 17/532,744, filed Nov. 22, 2021, 21 pages.
Final Office Action mailed on Aug. 9, 2023, issued in connection with U.S. Appl. No. 17/493,430, filed Oct. 4, 2021, 19 pages.
*Google LLC v. Sonos, Inc.*, International Trade Commission Case No. 337-TA-1330, Order No. 25: Regarding Respondent Sonos, Inc.'s Omnibus Motion for Summary Determination; dated May 16, 2023, 7 pages.
*Google LLC v. Sonos, Inc.*, International Trade Commission Case No. 337-TA-1330, Order No. 28: Regarding Respondent Sonos, Inc.'s Omnibus Motion for Summary Determination; dated May 22, 2023, 3 pages.
*Google LLC v. Sonos, Inc.*, International Trade Commission Case No. 337-TA-1330, Order No. 37: Regarding Complainant Google LLC's Motions in Limine; dated Jul. 7, 2023, 10 pages.
*Google LLC v. Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC v. Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.
Notice of Allowance mailed on Nov. 8, 2023, issued in connection with U.S. Appl. No. 18/066,093, filed Dec. 14, 2022, 11 pages.
Simon Doclo et al. Combined Acoustic Echo and Noise Reduction Using GSVD-Based Optimal Filtering. in 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=enas_sdt=0%2C14q=COMBINED+ACOUSTIC+ECHO+AND+NOISE+REDUCTION+USING+GSVD-BASED+OPTIMAL+FILTERING&btnG=.
Tweet: "How to start using Google app voice commands to make your life easier Share This Story shop @Bullet", Jan. 21, 2016, https://bgr.com/2016/01/21/best-ok-google-voice-commands/, 3 page.
Wolf et al. On the potential of channel selection for recognition of reverberated speech with multiple microphones. Interspeech, Talp Research Center, Jan. 2010, 5 pages.
Wölfel et al. Multi-source far-distance microphone selection and combination for automatic transcription of lectures, Interspeech 2006—ICSLP, Jan. 2006, 5 pages.
Zhang et al. Noise Robust Speech Recognition Using Multi-Channel Based Channel Selection and Channel Weighting. the Institute of Electronics, Information and Communication Engineers, arXiv:1604.03276v1 [cs.SD] Jan. 1, 2010, 8 pages.
Helwani et al. Source-domain adaptive filtering for MIMO systems with application to acoustic echo cancellation. in 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14q=SOURCE-DOMAIN+ADAPTIVE+FILTERING+FOR+MIMO+SYSTEMS+WITH+APPLICATION+TO+ACOUSTIC+ECHO+CANCELLATION&btnG=.
Indian Patent Office, Examination Report mailed on Dec. 5, 2023, issued in connection with Indian Patent Application No. 201847035625, 3 pages.
International Bureau, International Search Report and Written Opinion mailed on Mar. 20, 2023, issued in connection with International Application No. PCT/US2022/045399, filed on Sep. 30, 2022, 25 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on May 23, 2023, issued in connection with Japanese Patent Application No. 2021-163622, 13 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Mar. 31, 2023, issued in connection with Korean Application No. 10-2022-7016656, 7 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Korean Patent Office, Office Action and Translation mailed on Feb. 27, 2023, issued in connection with Korean Application No. 10-2022-7021879, 5 pages.
Mathias Wolfel. Channel Selection by Class Separability Measures for Automatic Transcriptions on Distant Microphones, Interspeech 2007 10.21437/Interspeech.2007-255, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.

(56) References Cited

OTHER PUBLICATIONS

Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Aug. 10, 2023, issued in connection with U.S. Appl. No. 18/070,024, filed Nov. 28, 2022, 4 pages.
Non-Final Office Action mailed on Apr. 12, 2023, issued in connection with U.S. Appl. No. 17/878,649, filed Aug. 1, 2022, 16 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Sep. 14, 2023, issued in connection with U.S. Appl. No. 17/528,843, filed Nov. 17, 2021, 20 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Jan. 19, 2024, issued in connection with U.S. Appl. No. 18/331,580, filed Jun. 8, 2023, 11 pages.
Non-Final Office Action mailed on Apr. 20, 2023, issued in connection with U.S. Appl. No. 18/061,570, filed Dec. 5, 2022, 12 pages.
Non-Final Office Action mailed on Nov. 21, 2023, issued in connection with U.S. Appl. No. 18/088,976, filed Dec. 27, 2022, 9 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Non-Final Office Action mailed on Oct. 23, 2023, issued in connection with U.S. Appl. No. 17/932,715, filed Sep. 16, 2022, 14 pages.
Non-Final Office Action mailed on Apr. 24, 2023, issued in connection with U.S. Appl. No. 17/532,744, filed Nov. 22, 2021, 18 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on May 25, 2023, issued in connection with U.S. Appl. No. 18/157,937, filed Jan. 23, 2023, 9 pages.
Non-Final Office Action mailed on Jan. 26, 2024, issued in connection with U.S. Appl. No. 17/450,925, filed Oct. 14, 2021, 9 pages.
Non-Final Office Action mailed on Feb. 27, 2023, issued in connection with U.S. Appl. No. 17/493,430, filed Oct. 4, 2021, 17 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Jul. 3, 2023, issued in connection with U.S. Appl. No. 17/135,173, filed Dec. 28, 2020, 22 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Oct. 6, 2023, issued in connection with U.S. Appl. No. 17/222,950, filed Apr. 5, 2021, 9 pages.
Non-Final Office Action mailed on Feb. 7, 2023, issued in connection with U.S. Appl. No. 17/303,001, filed May 18, 2021, 8 pages.
Non-Final Office Action mailed on Jun. 7, 2023, issued in connection with U.S. Appl. No. 16/179,779, filed Nov. 2, 2018, 29 pages.
Non-Final Office Action mailed on Sep. 7, 2023, issued in connection with U.S. Appl. No. 17/340,590, filed Jun. 7, 2021, 18 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Jul. 10, 2023, issued in connection with U.S. Appl. No. 17/315,599, filed May 10, 2021, 2 pages.
Notice of Allowance mailed on Aug. 11, 2023, issued in connection with U.S. Appl. No. 17/878,649, filed Aug. 1, 2022, 7 pages.
Notice of Allowance mailed on May 11, 2023, issued in connection with U.S. Appl. No. 18/061,638, filed Dec. 5, 2022, 15 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.
Notice of Allowance mailed on Feb. 13, 2023, issued in connection with U.S. Appl. No. 18/045,360, filed Oct. 10, 2022, 9 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Sep. 14, 2023, issued in connection with U.S. Appl. No. 18/061,579, filed Dec. 5, 2022, 7 pages.
Notice of Allowance mailed on Dec. 15, 2023, issued in connection with U.S. Appl. No. 18/157,937, filed Jan. 23, 2023, 8 pages.
Notice of Allowance mailed on Feb. 15, 2023, issued in connection with U.S. Appl. No. 17/659,613, filed Apr. 18, 2022, 21 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Aug. 16, 2023, issued in connection with U.S. Appl. No. 17/536,572, filed Nov. 29, 2021, 7 pages.

(56) References Cited

OTHER PUBLICATIONS

Notice of Allowance mailed on Oct. 2, 2023, issued in connection with U.S. Appl. No. 17/810,533, filed Jul. 1, 2022, 8 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Mar. 20, 2023, issued in connection with U.S. Appl. No. 17/562,412, filed Dec. 27, 2021, 9 pages.
Notice of Allowance mailed on Aug. 21, 2023, issued in connection with U.S. Appl. No. 17/548,921, filed Dec. 13, 2021, 10 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Feb. 23, 2023, issued in connection with U.S. Appl. No. 17/532,674, filed Nov. 22, 2021, 10 pages.
Notice of Allowance mailed on Nov. 24, 2023, issued in connection with U.S. Appl. No. 18/070,024, filed Nov. 28, 2022, 7 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Dec. 29, 2022, issued in connection with U.S. Appl. No. 17/327,911, filed May 24, 2021, 14 pages.
Notice of Allowance mailed on Mar. 29, 2023, issued in connection with U.S. Appl. No. 17/722,438, filed Apr. 18, 2022, 7 pages.
Notice of Allowance mailed on Sep. 29, 2023, issued in connection with U.S. Appl. No. 16/168,389, filed Oct. 23, 2018, 11 pages.
Notice of Allowance mailed on Jun. 30, 2023, issued in connection with U.S. Appl. No. 17/303,001, filed May 18, 2021, 8 pages.
Notice of Allowance mailed on Mar. 30, 2023, issued in connection with U.S. Appl. No. 17/303,066, filed May 19, 2021, 7 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on Aug. 4, 2023, issued in connection with U.S. Appl. No. 18/145,520, filed Dec. 22, 2022, 10 pages.

* cited by examiner

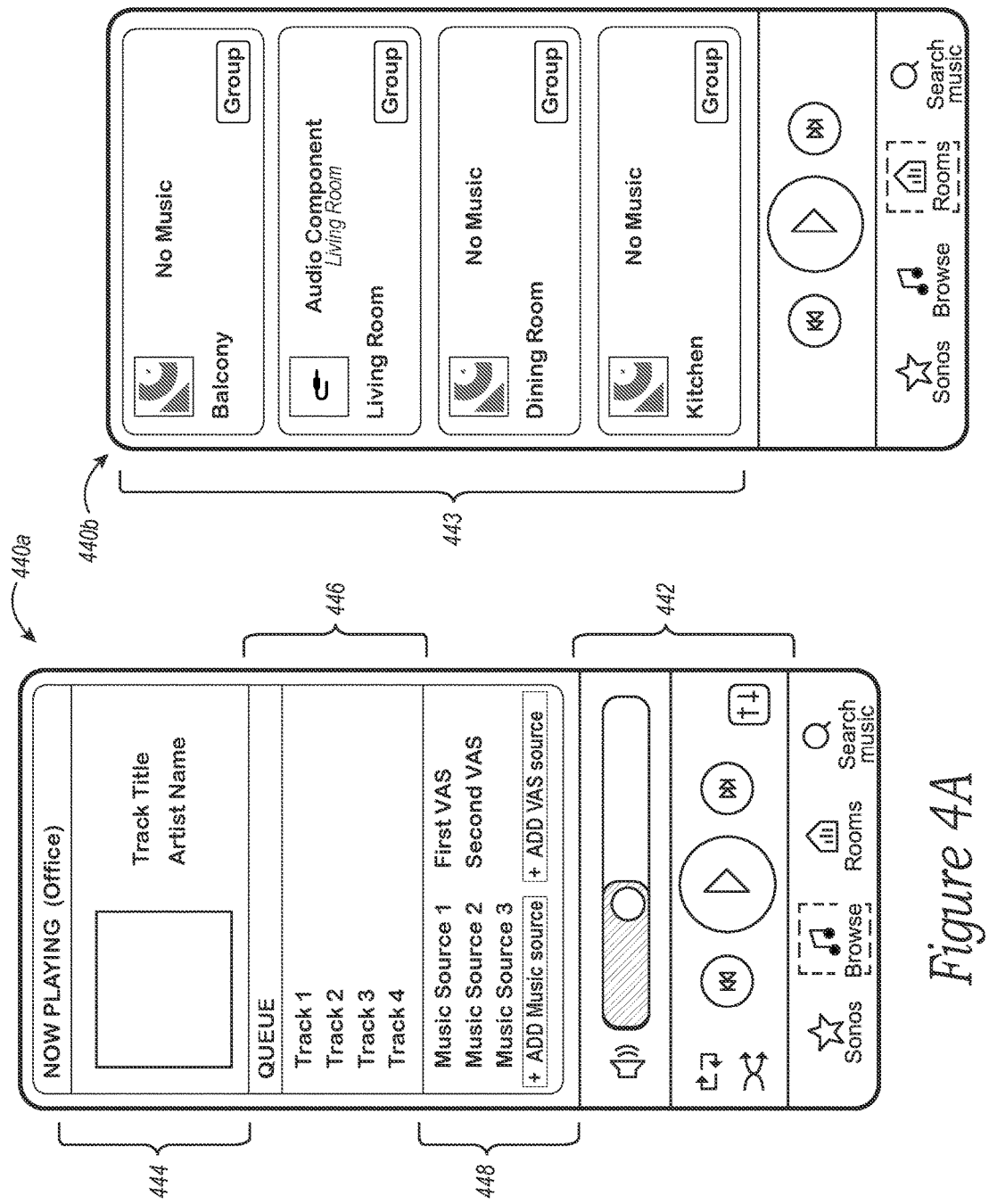

ROBUST SHORT-TIME FOURIER TRANSFORM ACOUSTIC ECHO CANCELLATION DURING AUDIO PLAYBACK

CROSS REFERENCE TO RELATED APPLICATIONS

This application is a continuation of U.S. patent application Ser. No. 17/327,911, filed on May 24, 2021, issued as U.S. Pat. No. 11,646,045 on May 9, 2023, which is a continuation of U.S. patent application Ser. No. 16/600,644, filed on Oct. 14, 2019, issued as U.S. Pat. No. 11,017,789 on May 25, 2021, which is a continuation of U.S. patent application Ser. No. 15/717,621, filed on Sep. 27, 2017, issued as U.S. Pat. No. 10,466,165 on Oct. 15, 2019, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 4A and 4B are controller interfaces;

Figure 1:
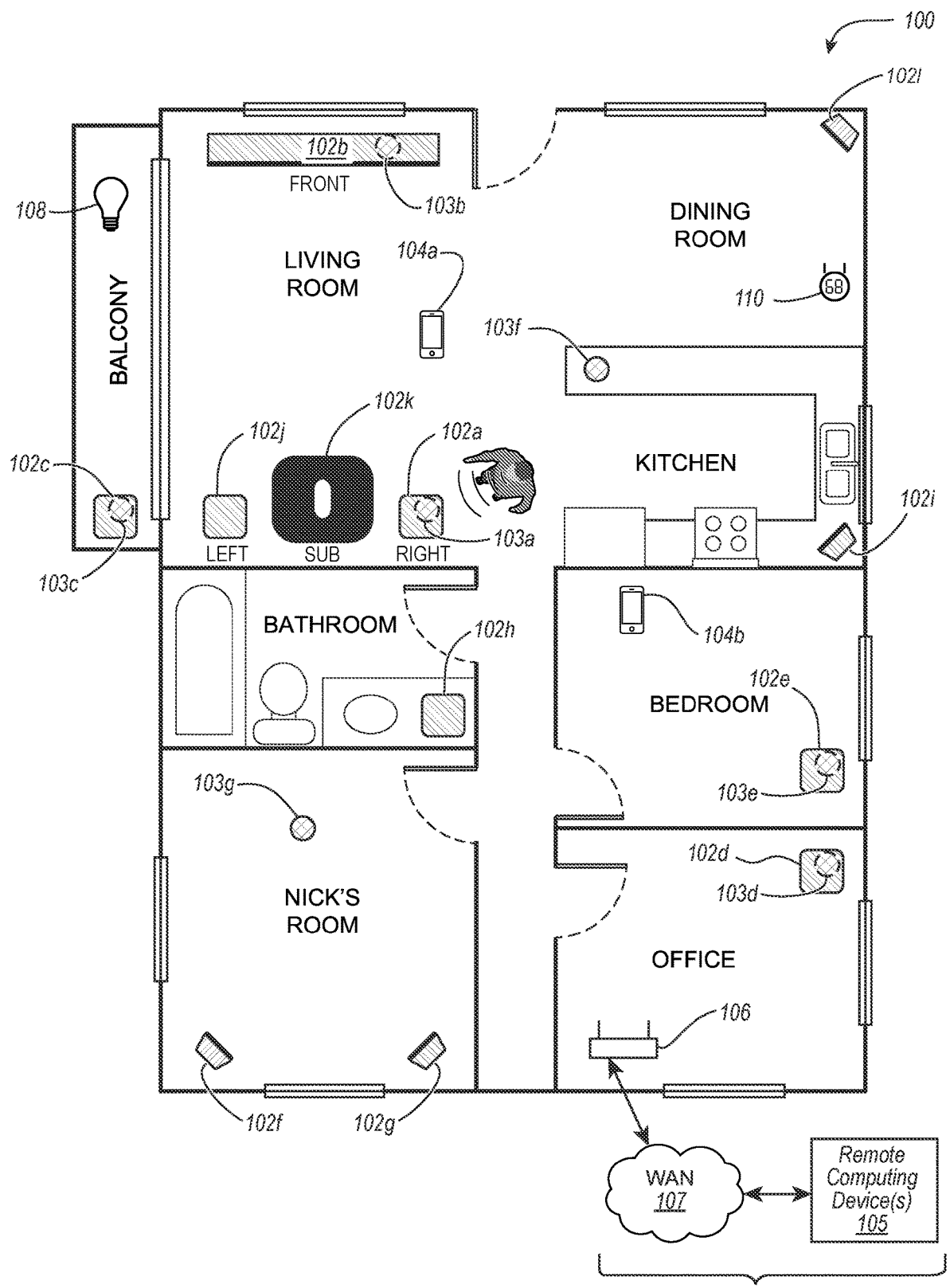
FIG. 1 shows a media playback system configuration in which certain embodiments may be practiced.

The drawings are for purposes of illustrating example embodiments, but it is understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 110 is first introduced and discussed with reference to FIG. 1.

DETAILED DESCRIPTION

I. Overview

Networked microphone devices may be used to control a household using voice control. Voice control can be beneficial for a "smart" home having a system of smart devices, such as playback devices, wireless illumination devices, thermostats, door locks, home-automation devices, as well as other examples. In some implementations, the system of smart devices includes a networked microphone device configured to detect voice inputs. A voice assistant service facilitates processing of the voice inputs. Traditionally, the voice assistant service includes remote servers that receive and process voice inputs. The voice service may return responses to voice inputs, which might include control of various smart devices or audio or video information (e.g., a weather report), among other examples.

A voice input typically includes an utterance with a wake word followed by an utterance containing a user request. A wake word, when uttered, may invoke a particular voice assistance service. For instance, in querying the AMAZON® voice assistant service, a user might speak a wake word "Alexa." Other examples include "Ok, Google" for invoking the GOOGLE® voice assistant service and "Hey, Siri" for invoking the APPLE® voice assistant service.

Upon detecting a wake word, a networked microphone device may listen for the user request in the voice utterance following the wake word. In some instances, the user request may include a command to control a third party device, such as a smart illumination device (e.g., a PHILIPS HUE® lighting device), a thermostat (e.g., NEST® thermostat), or a media playback device (e.g., a Sonos® playback device). For example, a user might speak the wake word "Alexa" followed by the utterance "turn on the living room" to turn on illumination devices. A user might speak the same wake word followed by the utterance "set the thermostat to 68 degrees." The user may also utter a request for a playback device to play a particular song, an album, or a playlist of music.

When a playback device is playing audio in the same acoustic environment as a networked microphone device, sound captured by the microphone(s) of the networked microphone device might include the sound of the audio playback as well as an uttered voice input. Since the sound of the audio playback might interfere with processing of the voice input by a voice assistant service (e.g., if the audio playback drowns out the voice input), an Acoustic Echo Canceller ("AEC") may be used to remove the sound of the audio playback from the signal captured by microphone(s) of the networked microphone device. This removal is intended to improve the signal-to-noise ratio of a voice input to other sound within the acoustic environment, which includes the sound produced by the one or more speakers in playing back the audio content, so as to provide a less noisy signal to the voice assistant service.

In example implementations, an AEC is implemented within the audio processing pipeline of an audio playback device or a networked microphone device. Inputs to an AEC may include the signal captured by the microphone(s) of a networked microphone device, and a reference signal. To represent the audio playback as closely as practical, the reference signal may be taken from a point in the audio playback pipeline that closely represents the analog audio expected to be output by the transducers. Given these inputs, the AEC attempts to find a transfer function (i.e., a 'filter') that transforms the reference signal into the captured microphone signal with minimal error. Inverting the resulting AEC output and mixing it with the microphone signal causes a redaction of the audio output signal from the signal captured by the microphone(s).

As those of ordinary skill in the art will appreciate, one issue with conventional AEC techniques is 'double-talk'. Double-talk can occur, for example, when two people talk concurrently in the same acoustic environment being captured by the microphones. A conventional AEC may treat one 'voice' as an input while the other voice is treated as changing room effect. In this condition, the conventional AEC may attempt to adapt to the changing "room effect" but cannot keep up with the pace of advancement of the speech. In such conditions, the AEC may de-stabilize and introduce more noise into the system than it was supposed to remove. Yet, the capture of multiple concurrent voices is expected to be a common condition in many environments, such as a home with multiple users and possibly multiple networked microphone devices.

To avoid this condition, some systems have implemented a double-talk detector, which is designed to detect when two or more users are talking in the same acoustic environment and suspending the AEC during the double-talk condition. Using a double-talk detector may help to avoid destabilization of the AEC during double-talk conditions. But by suspending the AEC during the double-talk condition, the AEC no longer cancels echoes within the acoustic environment, which ultimately results in a "noisier" voice input to the voice assistant service. Moreover, utilizing a double-talk detector requires additional processing capability.

Example implementations described herein may improve acoustic echo cancellation though a combination of techniques. Such techniques may include processing in the Short-Time Fourier Transform ("STFT") instead of the Frequency-Dependent Adaptive Filter ("FDAF") domain). The techniques may also include using a mathematical processing model that keeps the AEC robust in face of double-talk conditions and in noisy environments. The techniques can further include applying a sparsity criterion that improves converge rate of the adaptive filter by focusing adaptation of the filter on only those areas of the impulse response which are in greatest error. Inactive portions of the filter are deactivated, so as to allow use of a high order multi delay filter where only the partitions that correspond to the actual model are active, thereby increasing stability and hastening convergence.

These techniques can result in tolerance for frequent double-talk conditions without compromising AEC performance during audio playback.

Example techniques described herein may involve acoustic echo cancellation. An example implementation may involve causing, via an audio stage, the one or more speakers to play back audio content and while the audio content is playing back via the one or more speakers, capturing, via the one or more microphones, audio within an acoustic environment, wherein the captured audio comprises audio signals representing sound produced by the one or more speakers in playing back the audio content. The example implementation may further involve receiving an output signal from the audio stage representing the audio content being played back by the one or more speakers, determining a measured signal comprising a series of frames representing the captured audio within the acoustic environment by transforming into a short time Fourier transform (STFT) domain the captured audio within the acoustic environment, and determining a reference signal comprising a series of frames representing the audio content being played back via the one or more speakers by transforming into the STFT domain the received output signal from the audio stage.

During each $n^{th}$ iteration of an acoustic echo canceller (AEC), the implementation may involve determining an $n^{th}$ frame of an output signal. Determining the $n^{th}$ frame of the output signal may involve generating an $n^{th}$ frame of a model signal by passing an $n^{th}$ frame of the reference signal through an $n^{th}$ instance of an adaptive filter, wherein the first instance of the adaptive filter is an initial filter; and generating the $n^{th}$ frame of the output signal by redacting the $n^{th}$ frame of the model signal from an $n^{th}$ frame of the measured signal. The example implementation may also involve sending the output signal as a voice input to one or more voice services for processing of the voice input The implementation may further involve, during each $n^{th}$ iteration of the acoustic echo canceller (AEC), determining a $n+1^{th}$ instance of the adaptive filter for a next iteration of the AEC. Determining the $n+1^{th}$ instance of the adaptive filter for the next iteration of the AEC may involve determining an $n^{th}$ frame of an error signal, the $n^{th}$ frame of the error signal representing a difference between the $n^{th}$ frame of the model signal and the $n^{th}$ frame of the reference signal less audio signals representing sound from sources other than an $n^{th}$ frame of the audio signals representing sound produced by the one or more speakers in playing back the $n^{th}$ frame of the reference signal, determining a normalized least mean square (NMLS) of the $n^{th}$ frame of the error signal, determining a sparse NMLS of the $n^{th}$ frame of the error signal by applying to the NMLS of the $n^{th}$ frame of the error signal, a sparse partition criterion that zeroes out frequency bands of the NMLS having less than a threshold energy, converting the sparse NMLS of the $n^{th}$ frame of the error signal to an $n^{th}$ update filter, and generating the $n+1^{th}$ instance of the adaptive filter for the next iteration of the AEC by summing the $n^{th}$ instance of the adaptive filter with the $n^{th}$ update filter.

This example implementation may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 illustrates an example configuration of a media playback system 100 in which one or more embodiments disclosed herein may be implemented. The media playback system 100 as shown is associated with an example home environment having several rooms and spaces, such as for example, an office, a dining room, and a living room. Within these rooms and spaces, the media playback system 100 includes playback devices 102 (identified individually as playback devices 102a-102l), network microphone devices 103 (identified individually as "NMD(s)" 103a-103g), and controller devices 104a and 104b (collectively "controller devices 104"). The home environment may include other network devices, such as one or more smart illumination devices 108 and a smart thermostat 110.

The various playback, network microphone, and controller devices 102-104 and/or other network devices of the media playback system 100 may be coupled to one another via point-to-point and/or over other connections, which may be wired and/or wireless, via a local area network (LAN) via a network router 106. For example, the playback device 102j (designated as "LEFT") may have a point-to-point connection with the playback device 102a (designated as "RIGHT"). In one embodiment, the LEFT playback device 102j may communicate over the point-to-point connection with the RIGHT playback device 102a. In a related embodiment, the LEFT playback device 102j may communicate with other network devices via the point-to-point connection and/or other connections via the LAN.

The network router 106 may be coupled to one or more remote computing device(s) 105 via a wide area network (WAN) 107. In some embodiments, the remote computing device(s) may be cloud servers. The remote computing device(s) 105 may be configured to interact with the media playback system 100 in various ways. For example, the remote computing device(s) may be configured to facilitate streaming and controlling playback of media content, such as audio, in the home environment. In one aspect of the technology described in greater detail below, the remote computing device(s) 105 are configured to provide an enhanced VAS 160 for the media playback system 100.

In some embodiments, one or more of the playback devices 102 may include an onboard (e.g., integrated) network microphone device. For example, the playback devices 102a-e include corresponding NMDs 103a-e, respectively. Playback devices that include network devices may be referred to herein interchangeably as a playback device or a network microphone device unless expressly stated otherwise.

In some embodiments, one or more of the NMDs 103 may be a stand-alone device. For example, the NMDs 103f and 103g may be stand-alone network microphone devices. A stand-alone network microphone device may omit components typically included in a playback device, such as a speaker or related electronics. In such cases, a stand-alone network microphone device might not produce audio output or may produce limited audio output (e.g., relatively low-quality output relative to quality of output by a playback device).

In some embodiments, one or more network microphone devices can be assigned to a playback device or a group of playback devices. In some embodiments, a network microphone device can be assigned to a playback device that does not include an onboard network microphone device. For example, the NMD 103f may be assigned to one or more of the playback devices 102 in its vicinity, such as one or both of the playback devices 102i and 102l in the kitchen and dining room spaces, respectively. In such a case, the NMD 103f may output audio through the playback device(s) to which it is assigned. Further details regarding assignment of network microphone devices are described, for example, in U.S. application Ser. No. 15/098,867 filed on Apr. 14, 2016, and titled "Default Playback Device Designation," and U.S. application Ser. No. 15/098,892 filed on Apr. 14, 2016 and titled "Default Playback Devices." Each of these applications is incorporated herein by reference in its entirety.

In some embodiments, a network microphone device may be configured such that it is dedicated exclusively to a particular VAS. In one example, the NMD 103a in the living room space may be dedicated exclusively to the enhanced VAS 160. In such case, the NMD 102a might not invoke any other VAS except the enhanced VAS 160. In a related example, other ones of the NMDs 103 may be configured to invoke the enhanced 160 VAS and one or more other VASes, such as a traditional VAS. Other examples of bonding and assigning network microphone devices to playback devices and/or VASes are possible. In some embodiments, the NMDs 103 might not be bonded or assigned in a particular manner.

Further aspects relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in other home environment configurations comprising more or fewer of any of the playback, network microphone, and/or controller devices 102-104. Additionally, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
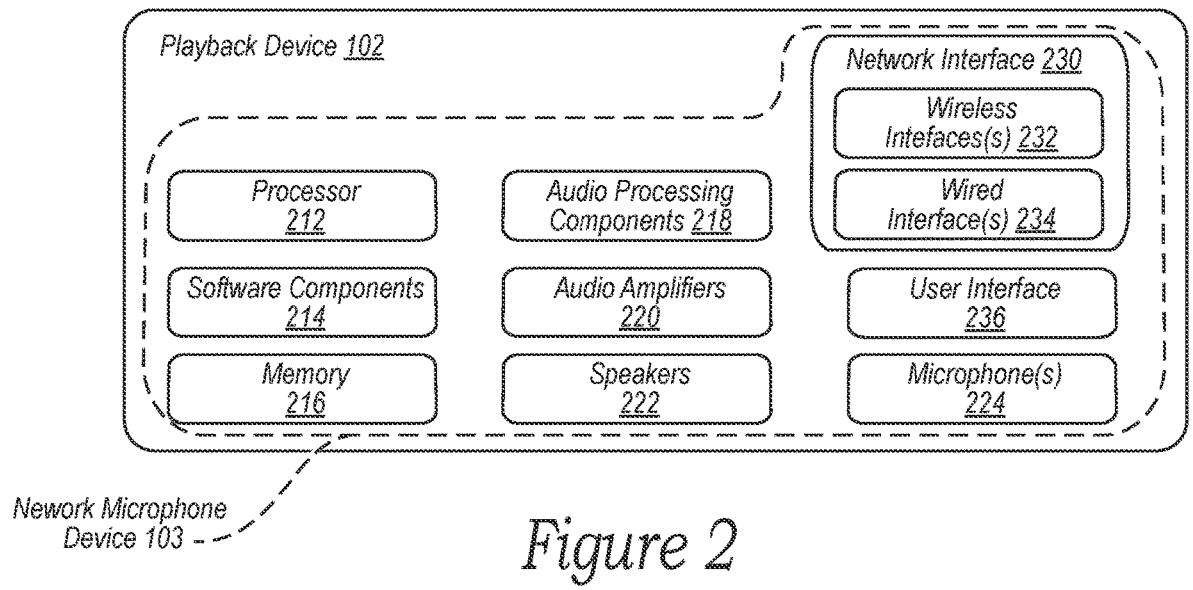
FIG. 2 is a functional block diagram of an example playback device.

FIG. 2 is a functional block diagram illustrating certain aspects of a selected one of the playback devices 102 shown in FIG. 1. As shown, such a playback device may include a processor 212, software components 214, memory 216, audio processing components 218, audio amplifier(s) 220, speaker(s) 222, and a network interface 230 including wireless interface(s) 232 and wired interface(s) 234. In some embodiments, a playback device might not include the speaker(s) 222, but rather a speaker interface for connecting the playback device to external speakers. In certain embodiments, the playback device includes neither the speaker(s) 222 nor the audio amplifier(s) 222, but rather an audio interface for connecting a playback device to an external audio amplifier or audio-visual receiver.

A playback device may further include a user interface 236. The user interface 236 may facilitate user interactions independent of or in conjunction with one or more of the controller devices 104. In various embodiments, the user interface 236 includes one or more of physical buttons and/or graphical interfaces provided on touch sensitive screen(s) and/or surface(s), among other possibilities, for a user to directly provide input. The user interface 236 may further include one or more of lights and the speaker(s) to provide visual and/or audio feedback to a user.

In some embodiments, the processor 212 may be a clock-driven computing component configured to process input data according to instructions stored in the memory 216. The memory 216 may be a tangible computer-readable medium configured to store instructions executable by the processor 212. For example, the memory 216 may be data storage that can be loaded with one or more of the software components 214 executable by the processor 212 to achieve certain functions. In one example, the functions may involve a playback device retrieving audio data from an audio source or another playback device. In another example, the functions may involve a playback device sending audio data to another device on a network. In yet another example, the functions may involve pairing of a playback device with one or more other playback devices to create a multi-channel audio environment.

Certain functions may involve a playback device synchronizing playback of audio content with one or more other playback devices. During synchronous playback, a listener should not perceive time-delay differences between playback of the audio content by the synchronized playback devices. U.S. Pat. No. 8,234,395 filed Apr. 4, 2004, and titled "System and method for synchronizing operations among a plurality of independently clocked digital data processing devices," which is hereby incorporated by reference in its entirety, provides in more detail some examples for audio playback synchronization among playback devices.

The memory 216 may be further configured to store data associated with a playback device. For example, the memory may store data corresponding to one or more zones and/or zone groups a playback device is a part of. One or more of the zones and/or zone groups may be named according to the room or space in which device(s) are located. For example, the playback and network microphone devices in the living room space shown in FIG. 1 may be referred to as a zone group named Living Room. As another example, the playback device 102l in the dining room space may be named as a zone "Dining Room." The zones and/or zone groups may also have uniquely assigned names, such as "Nick's Room," as shown in FIG. 1.

The memory 216 may be further configured to store other data. Such data may pertain to audio sources accessible by a playback device or a playback queue that the playback device (or some other playback device(s)) may be associated with. The data stored in the memory 216 may be stored as one or more state variables that are periodically updated and used to describe the state of the playback device. The memory 216 may also include the data associated with the state of the other devices of the media system, and shared from time to time among the devices so that one or more of the devices have the most recent data associated with the system. Other embodiments are also possible.

The audio processing components 218 may include one or more digital-to-analog converters (DAC), an audio preprocessing component, an audio enhancement component or a digital signal processor (DSP), and so on. In some embodiments, one or more of the audio processing components 218 may be a subcomponent of the processor 212. In one example, audio content may be processed and/or intentionally altered by the audio processing components 218 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback, the audio processing components 208 may be configured to process audio content to be sent to one or more other playback devices for playback.

Audio content to be processed and/or played back by a playback device may be received from an external source, such as via an audio line-in input connection (e.g., an auto-detecting 3.5 mm audio line-in connection) or the network interface 230.

The network interface 230 may be configured to facilitate a data flow between a playback device and one or more other devices on a data network. As such, a playback device may be configured to receive audio content over the data network from one or more other playback devices in communication with a playback device, network devices within a local area network, or audio content sources over a wide area network such as the Internet. In one example, the audio content and other signals transmitted and received by a playback device may be transmitted in the form of digital packet data containing an Internet Protocol (IP)-based source address and IP-based destination addresses. In such a case, the network interface 230 may be configured to parse the digital packet data such that the data destined for a playback device is properly received and processed by the playback device.

As shown, the network interface 230 may include wireless interface(s) 232 and wired interface(s) 234. The wireless interface(s) 232 may provide network interface functions for a playback device to wirelessly communicate with other devices (e.g., other playback device(s), speaker(s), receiver(s), network device(s), control device(s) within a data network the playback device is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 234 may provide network interface functions for a playback device to communicate over a wired connection with other devices in accordance with a communication protocol (e.g., IEEE 802.3). While the network interface 230 shown in FIG. 2 includes both wireless interface(s) 232 and wired interface(s) 234, the network interface 230 may in some embodiments include only wireless interface(s) or only wired interface(s).

In some embodiments, a playback device and one other playback device may be paired to play two separate audio components of audio content. For example, the LEFT playback device 102j in the Living Room may be configured to play a left channel audio component, while the RIGHT playback device 102a may be configured to play a right channel audio component, thereby producing or enhancing a stereo effect of the audio content. Similarly, the playback device 102l designated to the Dining Room may be configured to play a left channel audio component, while the playback device 102i designated to the Kitchen may be configured to play a right channel audio component. Paired playback devices may further play audio content in synchrony with other playback devices. Paired playback device may also be referred to as "bonded playback devices.

In some embodiments, one or more of the playback devices may be sonically consolidated with one or more other playback devices to form a single, consolidated playback device. A consolidated playback device may include separate playback devices each having additional or different speaker drivers through which audio content may be rendered. For example, a playback device designed to render low frequency range audio content (e.g., the playback device 102k designated as a subwoofer or "SUB") may be consolidated with a full-frequency playback device (e.g., the playback device 102b designated as "FRONT") to render the lower frequency range of the consolidated device. In such a case, the full frequency playback device, when consolidated with the low frequency playback device, may be configured to render only the mid and high frequency components of audio content, while the low-frequency playback device renders the low frequency component of the audio content. The consolidated playback device may be paired or consolidated with one or more other playback devices. For example, FIG. 1 shows the SUB playback device 102k consolidated with the FRONT playback device 102b to form subwoofer and center channels, and further consolidated with the RIGHT playback device 102a and the LEFT playback device 102j.

As discussed above, a playback device may include a network microphone device, such as one of the NMDs 103, as shown in FIG. 2. A network microphone device may share some or all the components of a playback device, such as the processor 212, the memory 216, the microphone(s) 224, etc. In other examples, a network microphone device includes components that are dedicated exclusively to operational aspects of the network microphone device. For example, a network microphone device may include far-field microphones and/or voice processing components, which in some instances a playback device may not include. In another example, a network microphone device may include a touch-sensitive button for enabling/disabling a microphone. In yet another example, a network microphone device can be a stand-alone device, as discussed above.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the media playback system 100 may be established with one or more playback zones, after which one or more of the playback and/or network devices 102-103 may be added or removed to arrive at the example configuration shown in FIG. 1. As discussed above, zones and zone groups may be given a unique name and/or a name corresponding to the space in which device(s) are located.

In one example, one or more playback zones in the environment of FIG. 1 may each be playing different audio content. For instance, the user may be grilling in the Balcony zone and listening to hip hop music being played by the playback device 102c while another user is preparing food in the Kitchen zone and listening to classical music being played by the playback device 102i. In another example, a playback zone may play the same audio content in synchrony with another playback zone. For instance, the user may be in the Office zone where the playback device 102d is playing the same hip-hop music that is being played by playback device 102c in the Balcony zone. In such a case, playback devices 102c and 102d may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

A network microphone device may receive voice inputs from a user in its vicinity. A network microphone device may capture a voice input upon detection of the user speaking the input. For instance, in the example shown in FIG. 1, the NMD 103a may capture the voice input of a user in the vicinity of the Living Room, Dining Room, and/or Kitchen zones. In some instances, other network microphone devices in the home environment, such as the NMD 104f in the Kitchen and/or the other NMD 104b in the Living Room may capture the same voice input. In such instances, network devices that detect the voice input may be configured to arbitrate between one another so that fewer or only the most proximate one of the NMDs 103 process the user's voice input. Other examples for selecting network microphone devices for processing voice input can be found, for example, in U.S. patent application Ser. No. 15/171,180 filed Jun. 9, 2016, and titled "Dynamic Player Selection for Audio Signal Processing" and U.S. patent application Ser. No. 15/211,748 filed Jul. 15, 2016, and titled "Voice Detection by Multiple Devices." Each of these references is incorporated herein by reference in its entirety. A network microphone device may control selected playback and/or network microphone devices 102-103 in response to voice inputs, as described in greater detail below.

As suggested above, the zone configurations of the media playback system 100 may be dynamically modified. As such, the media playback system 100 may support numerous configurations. For example, if a user physically moves one or more playback devices to or from a zone, the media playback system 100 may be reconfigured to accommodate the change(s). For instance, if the user physically moves the playback device 102c from the Balcony zone to the Office zone, the Office zone may now include both the playback devices 102c and 102d. In some cases, the use may pair or group the moved playback device 102c with the Office zone and/or rename the players in the Office zone using, e.g., one of the controller devices 104 and/or voice input. As another example, if one or more playback devices 102 are moved to a particular area in the home environment that is not already a playback zone, the moved playback device(s) may be renamed or associated with a playback zone for the particular area.

Further, different playback zones of the media playback system 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, playback devices 102 consolidated in the Living Room zone for the previously described consolidated TV arrangement may be split into (i) a television zone and (ii) a separate listening zone. The television zone may include the FRONT playback device 102*b*. The listening zone may include the RIGHT, LEFT, and SUB playback devices 102*a*, 102*j*, and 102*k*, which may be grouped, paired, or consolidated, as described above. Splitting the Living Room zone in such a manner may allow one user to listen to music in the listening zone in one area of the living room space, and another user to watch the television in another area of the living room space. In a related example, a user may implement either of the NMD 103*a* or 103*b* to control the Living Room zone before it is separated into the television zone and the listening zone. Once separated, the listening zone may be controlled by a user in the vicinity of the NMD 103*a*, and the television zone may be controlled by a user in the vicinity of the NMD 103*b*. As described above, however, any of the NMDs 103 may be configured to control the various playback and other devices of the media playback system 100.

c. Example Controller Devices

Figure 3:
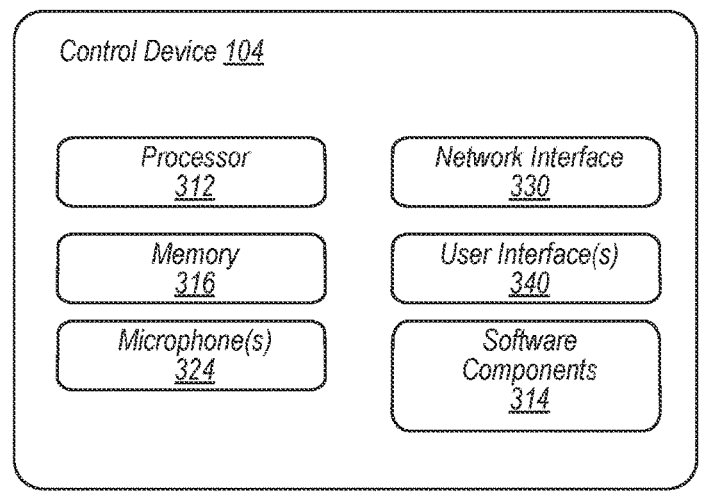
FIG. 3 is a functional block diagram of an example controller device.

FIG. 3 is a functional block diagram illustrating certain aspects of a selected one of the controller devices 104 of the media playback system 100 of FIG. 1. Such controller devices may also be referred to as a controller. The controller device shown in FIG. 3 may include components that are generally similar to certain components of the network devices described above, such as a processor 312, memory 316, microphone(s) 324, and a network interface 330. In one example, a controller device may be a dedicated controller for the media playback system 100. In another example, a controller device may be a network device on which media playback system controller application software may be installed, such as for example, an iPhone™, iPad™ or any other smart phone, tablet or network device (e.g., a networked computer such as a PC or Mac™).

The memory 316 of a controller device may be configured to store controller application software and other data associated with the media playback system 100 and a user of the system 100. The memory 316 may be loaded with one or more software components 314 executable by the processor 312 to achieve certain functions, such as facilitating user access, control, and configuration of the media playback system 100. A controller device communicates with other network devices over the network interface 330, such as a wireless interface, as described above.

In one example, data and information (e.g., such as a state variable) may be communicated between a controller device and other devices via the network interface 330. For instance, playback zone and zone group configurations in the media playback system 100 may be received by a controller device from a playback device, a network microphone device, or another network device, or transmitted by the controller device to another playback device or network device via the network interface 306. In some cases, the other network device may be another controller device.

Playback device control commands such as volume control and audio playback control may also be communicated from a controller device to a playback device via the network interface 330. As suggested above, changes to configurations of the media playback system 100 may also be performed by a user using the controller device. The configuration changes may include adding/removing one or more playback devices to/from a zone, adding/removing one or more zones to/from a zone group, forming a bonded or consolidated player, separating one or more playback devices from a bonded or consolidated player, among others.

The user interface(s) 340 of a controller device may be configured to facilitate user access and control of the media playback system 100, by providing controller interface(s) such as the controller interfaces 400*a* and 400*b* (collectively "controller interface 440") shown in FIGS. 4A and 4B, respectively. Referring to FIGS. 4A and 4B together, the controller interface 440 includes a playback control region 442, a playback zone region 443, a playback status region 444, a playback queue region 446, and a sources region 448. The user interface 400 as shown is just one example of a user interface that may be provided on a network device such as the controller device shown in FIG. 3 and accessed by users to control a media playback system such as the media playback system 100. Other user interfaces of varying formats, styles, and interactive sequences may alternatively be implemented on one or more network devices to provide comparable control access to a media playback system.

The playback control region 442 (FIG. 4A) may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 442 may also include selectable icons to modify equalization settings, and playback volume, among other possibilities.

The playback zone region 443 (FIG. 4B) may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 443 (FIG. 4B) may be dynamically updated as playback zone or zone group configurations are modified.

The playback status region 444 (FIG. 4A) may include graphical representations of audio content that is presently being played, previously played, or scheduled to play next in the selected playback zone or zone group. The selected playback zone or zone group may be visually distinguished on the user interface, such as within the playback zone region 443 and/or the playback status region 444. The graphical representations may include track title, artist name, album name, album year, track length, and other relevant information that may be useful for the user to know when controlling the media playback system via the user interface 440.

The playback queue region 446 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

With reference still to FIGS. 4A and 4B, the graphical representations of audio content in the playback queue region 446 (FIG. 4B) may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and selectable voice assistants associated with a corresponding VAS. The VASes may be selectively assigned. In some examples, multiple VASes, such as AMAZON's ALEXA® and another voice service, may be invokable by the same network microphone device. In some embodiments, a user may assign a VAS exclusively to one or more network microphone devices, as discussed above. For example, a user may assign first VAS to one or both of the NMDs 102*a* and 102*b* in the living room space shown in FIG. 1, and a second VAS to the NMD 103*f* in the kitchen space. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a controller device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Network Microphone Devices

Figure 5A:
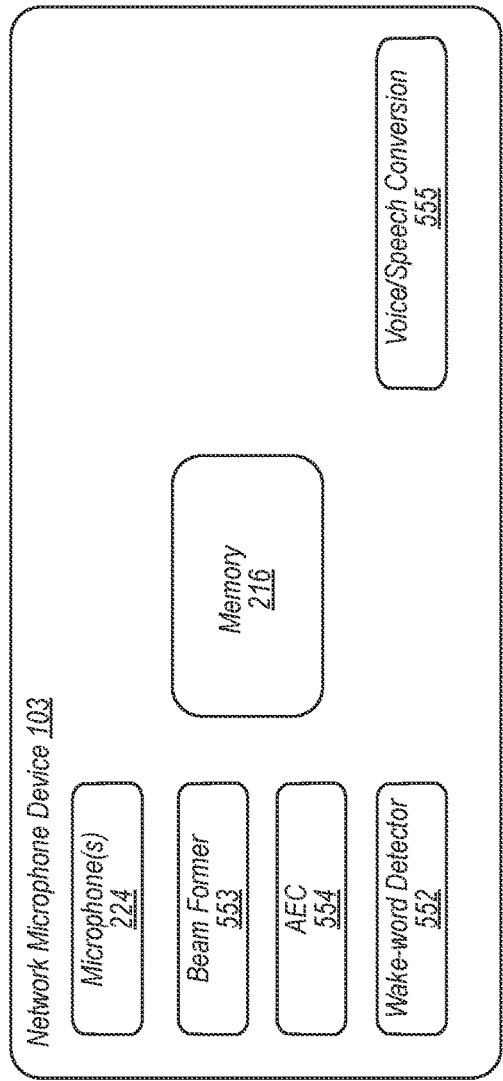
FIG. 5A is a functional block diagram of an example network microphone device in accordance with aspects of the disclosure.

FIG. 5A is a functional block diagram showing additional features of one or more of the NMDs 103 in accordance with aspects of the disclosure. The network microphone device shown in FIG. 5A may include components that are generally similar to certain components of network microphone devices described above, such as the processor 212 (FIG. 2), network interface 230 (FIG. 2), microphone(s) 224, and the memory 216. Although not shown for purposes of clarity, a network microphone device may include other components, such as speakers, amplifiers, signal processors, as discussed above.

The microphone(s) 224 may be a plurality of microphones arranged to detect sound in the environment of the network microphone device. In one example, the microphone(s) 224 may be arranged to detect audio from one or more directions relative to the network microphone device. The microphone(s) 224 may be sensitive to a portion of a frequency range. In one example, a first subset of the microphone(s) 224 may be sensitive to a first frequency range, while a second subset of the microphone(s) 224 may be sensitive to a second frequency range. The microphone(s) 224 may further be arranged to capture location information of an audio source (e.g., voice, audible sound) and/or to assist in filtering background noise. Notably, in some embodiments the microphone(s) 224 may have a single microphone rather than a plurality of microphones.

A network microphone device may further include wake-word detector 552, beam former 553, acoustic echo canceller (AEC) 554, and speech/text conversion 555 (e.g., voice-to-text and text-to-voice). In various embodiments, one or more of the wake-word detector 552, beam former 553, AEC 554, and speech/text conversion 555 may be a subcomponent of the processor 212, or implemented in software stored in memory 216 which is executable by the processor 212.

The wake-word detector 552 is configured to monitor and analyze received audio to determine if any wake words are present in the audio. The wake-word detector 552 may analyze the received audio using a wake word detection algorithm. If the wake-word detector 552 detects a wake word, a network microphone device may process voice input contained in the received audio. Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

In some embodiments, the wake-word detector 552 runs multiple wake word detections algorithms on the received audio simultaneously (or substantially simultaneously). As noted above, different voice services (e.g. AMAZON's ALEXA®, APPLE's SIRI®, or MICROSOFT's CORTANA®) each use a different wake word for invoking their respective voice service. To support multiple services, the wake word detector 552 may run the received audio through the wake word detection algorithm for each supported voice service in parallel.

The beam former 553 and AEC 554 are configured to detect an audio signal and determine aspects of voice input within the detect audio, such as the direction, amplitude, frequency spectrum, etc. For example, the beam former 553 and AEC 554 may be used in a process to determine an approximate distance between a network microphone device and a user speaking to the network microphone device. In another example, a network microphone device may detect a relative proximity of a user to another network microphone device in a media playback system.

Figure 5B:
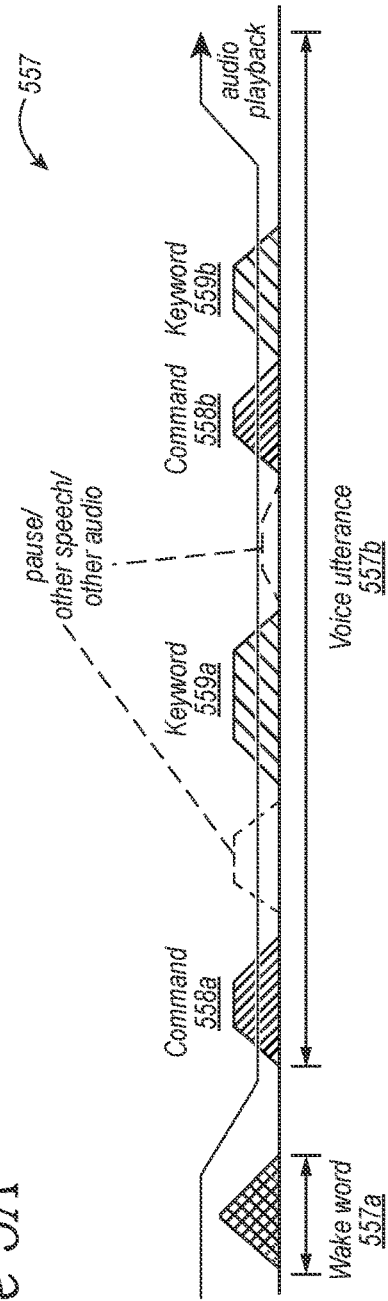
FIG. 5B is a diagram of an example voice input in accordance with aspects of the disclosure.

FIG. 5B is a diagram of an example voice input in accordance with aspects of the disclosure. The voice input may be captured by a network microphone device, such as by one or more of the NMDs 103 shown in FIG. 1. The voice input may include a wake word portion 557a and a voice utterance portion 557b (collectively "voice input 557"). In some embodiments, the wake word 557a can be a known wake word, such as "Alexa," which is associated with AMAZON's ALEXA®).

In some embodiments, a network microphone device may output an audible and/or visible response upon detection of the wake word portion 557a. In addition or alternately, a network microphone device may output an audible and/or visible response after processing a voice input and/or a series of voice inputs (e.g., in the case of a multi-turn request).

The voice utterance portion 557b may include, for example, one or more spoken commands 558 (identified individually as a first command 558a and a second command 558b) and one or more spoken keywords 559 (identified individually as a first keyword 559a and a second keyword 559b). In one example, the first command 557a can be a command to play music, such as a specific song, album, playlist, etc. In this example, the keywords 559 may be one or words identifying one or more zones in which the music is to be played, such as the Living Room and the Dining Room shown in FIG. 1. In some examples, the voice utterance portion 557b can include other information, such as detected pauses (e.g., periods of non-speech) between words spoken by a user, as shown in FIG. 5B. The pauses may demarcate the locations of separate commands, keywords, or other information spoken by the user within the voice utterance portion 557b.

In some embodiments, the media playback system 100 is configured to temporarily reduce the volume of audio content that it is playing while detecting the wake word portion 557a. The media playback system 100 may restore the volume after processing the voice input 557, as shown in FIG. 5B. Such a process can be referred to as ducking, examples of which are disclosed in U.S. patent application Ser. No. 15/277,810 filed Sep. 27, 2016, and titled "Audio Playback Settings for Voice Interaction," which is incorporated herein by reference in its entirety.

f. Example Network System

Figure 6:
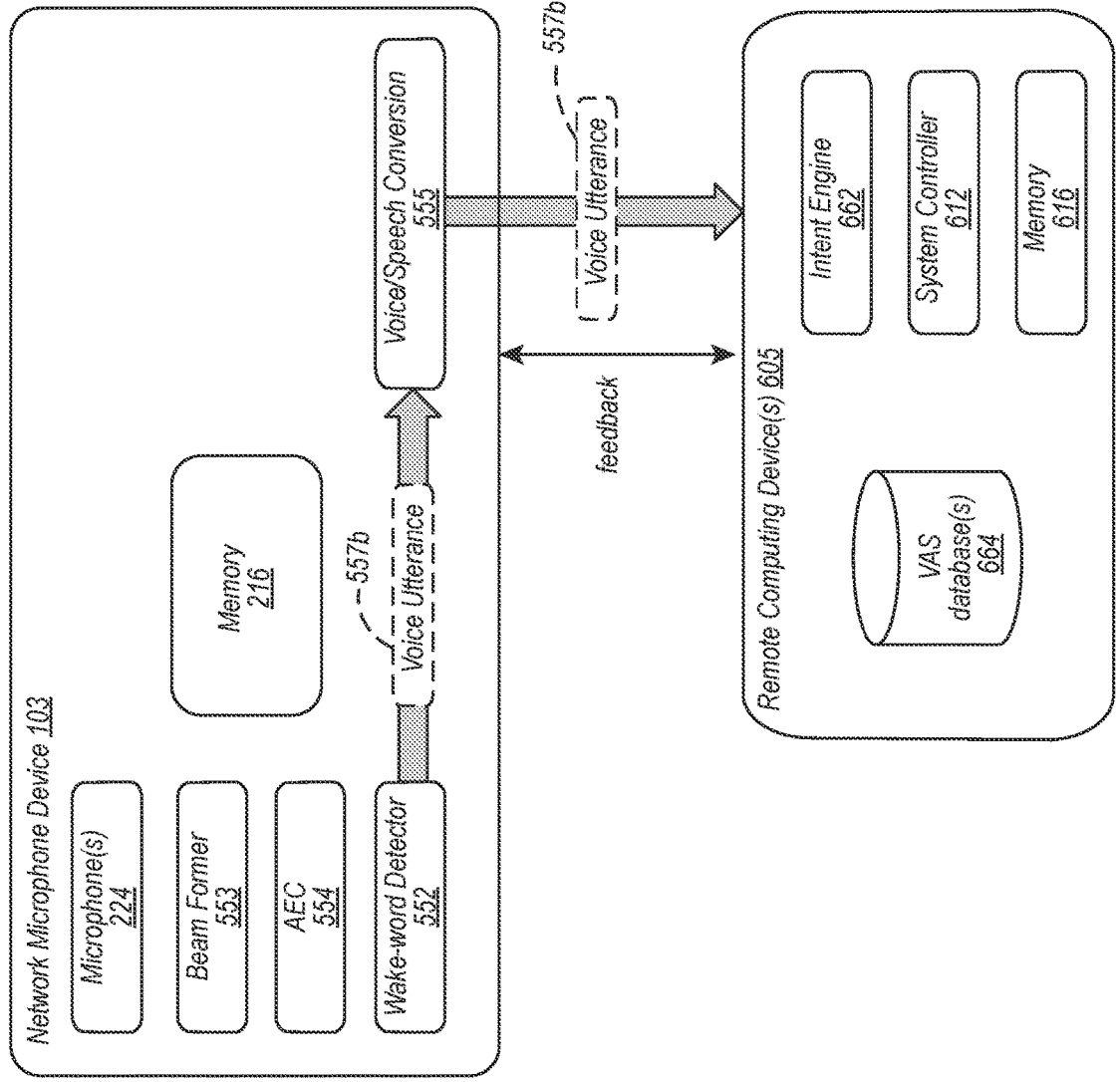
FIG. 6 is a functional block diagram of example remote computing device(s) in accordance with aspects of the disclosure.
Figure 7:
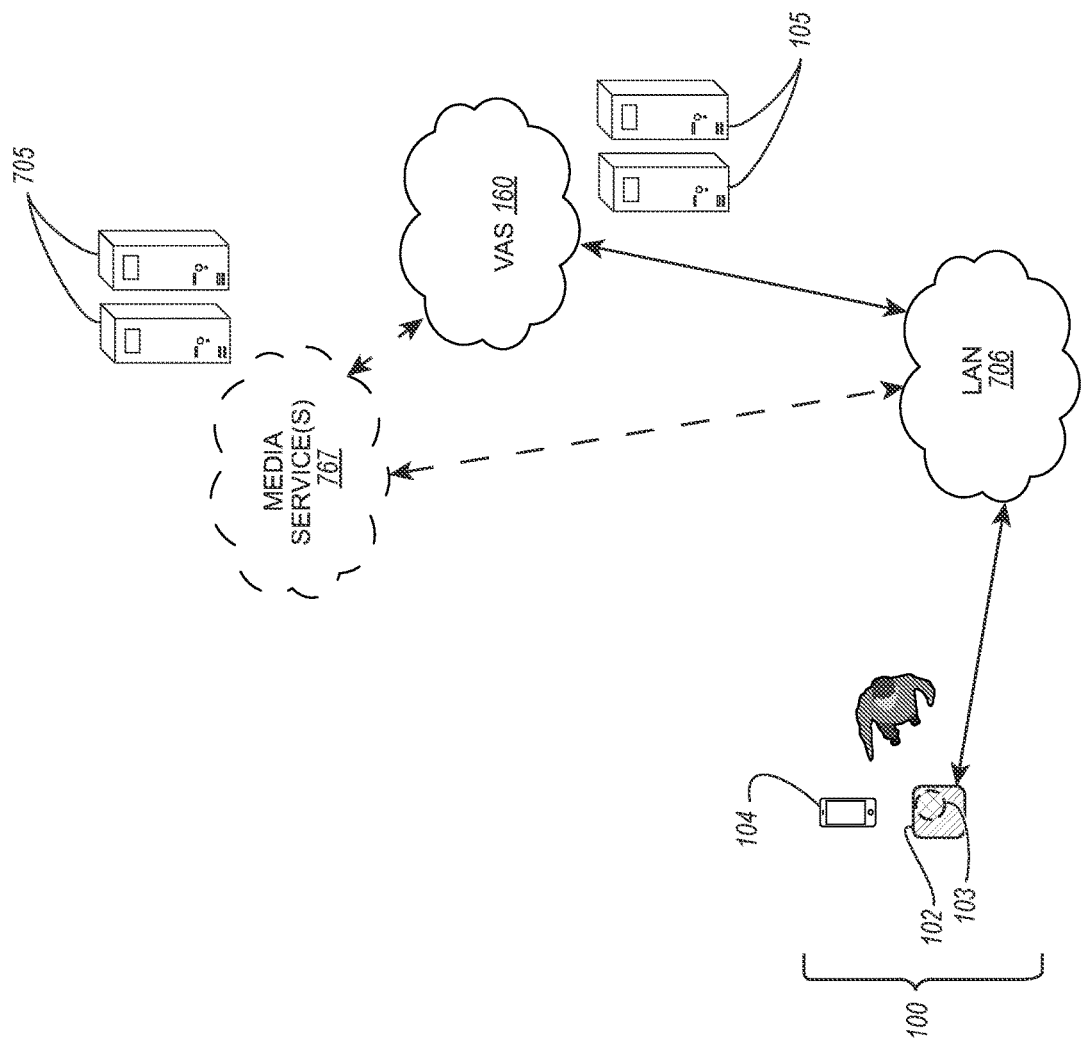
FIG. 7 is a schematic diagram of an example network system in accordance with aspects of the disclosure.

FIG. 6 is a functional block diagram showing additional details of the remote computing device(s) 105 in FIG. 1. In various embodiments, the remote computing device(s) 105 may receive voice inputs from one or more of the NMDs 103 over the WAN 107 shown in FIG. 1. For purposes of illustration, selected communication paths of the voice input 557 (FIG. 5B) are represented by arrows in FIG. 6. In one embodiment, the voice input 557 processed by the remote computing device(s) 105 may include the voice utterance portion 557b (FIG. 5B). In another embodiment, the processed voice input 557 may include both the voice utterance portion 557b and the wake word 557a (FIG. 5B).

The remote computing device(s) 105 include a system controller 612 comprising one or more processors, an intent engine 602, and a memory 616. The memory 616 may be a tangible computer-readable medium configured to store instructions executable by the system controller 612 and/or one or more of the playback, network microphone, and/or controller devices 102-104.

The intent engine 662 is configured to process a voice input and determine an intent of the input. In some embodiments, the intent engine 662 may be a subcomponent of the system controller 612. The intent engine 662 may interact with one or more database(s), such as one or more VAS database(s) 664, to process voice inputs. The VAS database(s) 664 may reside in the memory 616 or elsewhere, such as in memory of one or more of the playback, network microphone, and/or controller devices 102-104. In some embodiments, the VAS database(s) 664 may be updated for adaptive learning and feedback based on the voice input processing. The VAS database(s) 664 may store various user data, analytics, catalogs, and other information for NLU-related and/or other processing.

The remote computing device(s) 105 may exchange various feedback, information, instructions, and/or related data with the various playback, network microphone, and/or controller devices 102-104 of the media playback system 100. Such exchanges may be related to or independent of transmitted messages containing voice inputs. In some embodiments, the remote computing device(s) 105 and the media playback system 100 may exchange data via communication paths as described herein and/or using a metadata exchange channel as described in U.S. application Ser. No. 15/131,244 filed Apr. 18, 2016, and titled "Metadata exchange involving a networked playback system and a networked microphone system, which is incorporated by reference in its entirety.

Processing of a voice input by devices of the media playback system 100 may be carried out at least partially in parallel with processing of the voice input by the remote computing device(s) 105. Additionally, the speech/text conversion components 555 of a network microphone device may convert responses from the remote computing device(s) 105 to speech for audible output via one or more speakers.

III. Example Acoustic Echo Cancellation Techniques

Figure 8A:
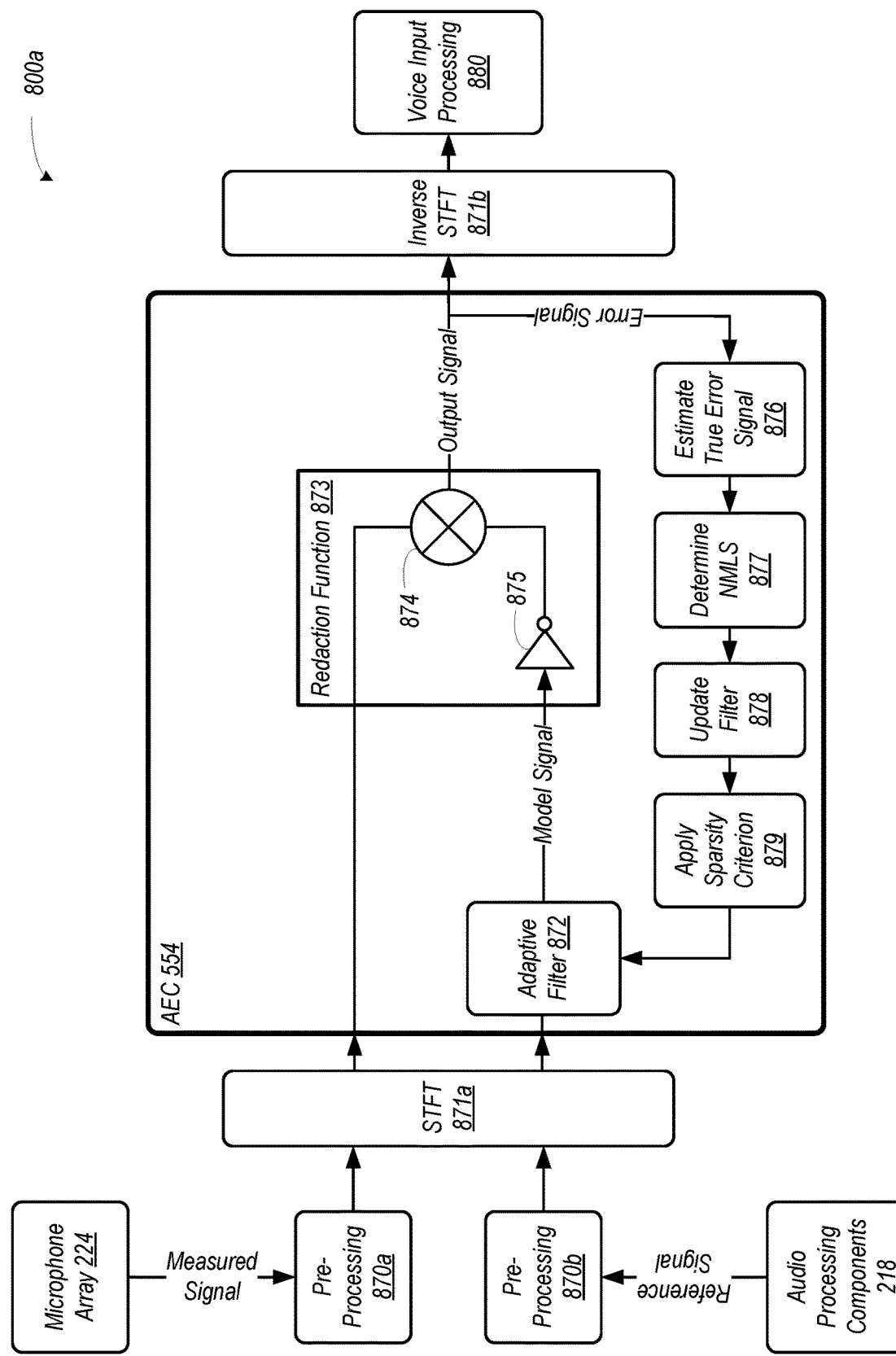
FIG. 8A is a functional block diagram of an example acoustic echo cancellation pipeline.

As discussed above, some embodiments described herein involve acoustic echo cancellation. FIG. 8A is a functional block diagram of an acoustic echo cancellation pipeline 800a configured to be implemented within a playback device that includes an NMD, such as NMDs 103a-e. By way of example, the acoustic echo cancellation pipeline 800a is described as being implemented within the playback device 102 of FIG. 2. However, in other implementations, acoustic echo cancellation pipeline 800a may be implemented in an NMD that is not necessarily a playback device (e.g., a device that doesn't include speakers, or includes relatively low-output speakers configured to provide audio feedback to voice inputs), such as NMDs 103f-g.

In operation, acoustic echo cancellation pipeline 800a may be activated when the playback device 102 is playing back audio content. As noted above, acoustic echo cancellation can be used to remove acoustic echo (i.e., the sound of the audio playback and reflections and/or other acoustic artifacts from the acoustic environment) from the signal captured by microphone(s) of the networked microphone device. When effective, acoustic echo cancellation improves the signal-to-noise ratio of a voice input with respect to other sound within the acoustic environment. In some implementations, when audio playback is paused or otherwise idle, the acoustic echo cancellation pipeline 800a is bypassed or otherwise disabled.

As shown in FIG. 8A, the microphone array 224 (FIG. 2) is configured to capture a "measured signal," which is an input to the acoustic echo cancellation pipeline 800a. As described above in reference to FIGS. 2 and 5, the microphone array 224 can be configured to capture audio within an acoustic environment in an attempt to detect voice inputs (e.g., wake-words and/or utterances) from one or more users. When the playback device 102 plays back audio content via speakers 222 (FIG. 2), the microphone array 224 can capture audio that also includes audio signals representing sound produced by speakers 222 in playing back the audio content, as well as other sound being produced within the acoustic environment.

At block 870a, the measured signal is pre-processed in advance of acoustic echo cancellation. Pre-processing of the measured signal may involve analog-to-digital conversion of the microphone array signals. Other pre-processing may include sample rate conversion, de-jittering, de-interleaving, or filtering, among other examples. The term "measured signal" is generally used to refer to the signal captured by the microphone array 224 before and after any pre-processing.

As shown in FIG. 8A, another input to the acoustic echo cancellation pipeline 800a is a "reference signal." The reference signal can represent the audio content being played back by the speakers 222 (FIG. 2). As shown, the reference signal is routed from the audio processing components 218. In an effort to more closely represent the audio content being played back by the speakers 222, the reference signal may be taken from a point in an audio processing pipeline of the audio processing components 218 that closely represents the expected analog audio output of speakers 222. Since each stage of an audio processing pipeline may introduce artifacts, the point in the audio processing pipeline of the audio processing components 218 that closely represents the expected analog audio output of the speakers 222 is typically near the end of the pipeline.

As noted above, although the acoustic echo cancellation pipeline 800a is shown by way of example as being illustrated within the playback device 102, the acoustic echo cancellation pipeline 800a may alternatively be implemented within a dedicated NMD such as NMD 103f-g of FIG. 1. In such examples, the reference signal may be sent from the playback device(s) that are playing back audio content to the NMD, perhaps via a network interface or other communications interface, such as a line-in interface.

At block 870b, the reference signal is pre-processed in advance of acoustic echo cancellation. Pre-processing of the reference signal may involve sample rate conversion, de-jittering, de-interleaving, time-delay, or filtering, among other examples. The term "measured signal" is generally used to refer to the signal captured by the microphone array 224 before and after any pre-processing.

Pre-processing the measured signal and the reference signals readies the signals for mixing during acoustic echo cancellation. For instance, since audio content is output by the speakers 222 before the microphone array 224 captures a representation of that same content, time-delay may be introduced to the reference signal to time-align the measured and reference signals. Similarly, since the respective sample rates of analog-to-digital conversation of the analog microphone signals and the reference signal from the audio processing components 218 may be different, sample rate conversation of one or both of the signals may convert the signal(s) into the same or otherwise compatible sample rates. Other similar pre-processing may be performed in blocks 870a and 870b to render the measured signals and reference signals compatible.

At block 871a, the measured and reference signals are converted into the short-time Fourier transform domain. Acoustic echo cancellation in the STFT domain may lessen the processing requirements of acoustic echo cancellation as compared with acoustic echo cancellation in other domains, such as the Frequency-Dependent Adaptive Filter ("FDAF") domain. As such, by processing in the STFT domain, additional techniques for acoustic echo cancellation may become practical.

As those of ordinary skill in the art will appreciate, a STFT is a transform used to determine the sinusoidal frequency and phase content of local sections (referred to as "frames" or "blocks") of a signal as it changes over time. To compute a STFTs of the measured and reference signals, each signal is divided into a plurality of frames. In an example implementation, each frame is 16 milliseconds (ms) long. The number of samples in a 16 ms frame may vary based on the sample rate of the measured and reference signals.

Given a signal x(n), the signal is transformed to the STFT domain by:

$$X_k[m]=\Sigma_{n=0}^{N-1}x[n+mR]w_A[n]\omega_N^{kn},$$

where k is the frequency index, m is the frame index, N is the frame size, R is the frame shift size, $w_A[n]$ is an analysis window of size N, and $$\omega_N = \exp\left(-j\frac{2\pi}{N}\right).$$

Referring now to AEC 554 (FIG. 5A), after being converted into the STFT domain, the measured and reference signals are provided as input to the AEC 554, as shown in FIG. 8A. The acoustic echo cancellation performed by the AEC 554 on the measured signal is an iterative process. Each iteration of the AEC 554 processes a respective frame of the measured signal using a respective frame of the reference signal. Such processing includes passing a frame of the reference signal through the adaptive filter 872 to yield a frame of a model signal. The adaptive filter 872 is intended to transform the reference signal into the measured signal with minimal error. In other words, the model signal is an estimate of the acoustic echo.

To cancel the acoustic echo from the measured signal, the measured signal and the model signal are provided to a redaction function 873. Redaction function 873 redacts the model signal from the measured signal, thereby cancelling the estimated acoustic echo from the measured signal yielding an output signal. In some examples, the redaction function 873 redacts the model signal from the measured signal by inverting the model signal via inverter 874 and mixing the inverted model signal with a frame of the measured signal with mixer 875. In effect, this mixing removes the audio playback (the reference signal) from the measured signal, thereby cancelling the echo (i.e., the audio playback and associated acoustic effects) from the measured signal. Alternate implementations may use other techniques for redaction.

At block 871b, the output signal of AEC 554 is transformed back by applying the inverse STFT. The inverse STFT is applied by:

$$x[n]=\Sigma_m\Sigma_{k=0}^{N-1}X_k[m]w_S[n-mR]\omega_N^{-k(n-mR)},$$

where $w_S[n]$ is a synthesis window.

After block 871b, the output signal is provided to a voice input processing pipeline at block 880. Voice input processing may involve wake-word detection, voice/speech conversion, and/or sending one or more voice utterances to a voice assistant service, among other examples.

Turning now in more detail to internal aspects of the AEC 554, at block 872, the reference signal in the STFT domain is passed through the adaptive filter 872. As noted above, the adaptive filter 872 is a transfer function that adapts during each iteration of the AEC 554 in an attempt to transform the reference signal into the measured signal with diminishing error. Passing a frame of the reference signal through adaptive filter 872 yields a frame of a model signal. The model signal is an estimate of the acoustic echo of the reference signal (i.e., the audio that is being cancelled).

Within examples, adaptive filter 872 implements multi-delay adaptive filtering. To illustrate example multi-delay adaptive filtering, let N be the multi-delay filter (MDF) block size, K be the number of blocks and $F_{2N}$ denote the 2N×2N Fourier transform matrix, and the frequency-domain signals for frame m are:

$$e(m)=F_{2N}[0_{1\times N},e(mN),\ldots,e(mN+N-1)]^T,$$

$$X_k(m)=\mathrm{diag}\{F_{2N}[x((m-k-1)N-1),\ldots,x((m-k+1)N-1)]^T\},$$

$$d(m)=F_{2N}[0_{1\times N},d(mN),\ldots,d(mN+N-1)]^T,$$

where d(m) is the modeled signal, e(m) is the modeling error, and $X_k(m)$ is the measured signal. The MDF algorithm then becomes:

$$e(m)=d(m)-\hat{y}(m),$$

$$\hat{y}(m)=\Sigma_{k=0}^{K-1}G_1X_k(m)\hat{h}_k(m-1),$$

with model update:

$$\forall k:\hat{h}_k(m)=\hat{h}_k(m-1)+G_2\mu_m(m)\nabla\hat{h}_k(m), \text{ and}$$

$$\nabla\hat{h}_k(m)=P_{X_kX_k}^{-1}(m)X_k^H(m)e(m),$$

where $G_1$ and $G_2$ are matrices which select certain time-domain parts of the signal in the frequency domain, $$G_1 = F_{2N}\begin{bmatrix}0_{N\times N} & 0_{N\times N}\\ 0_{N\times N} & I_{N\times N}\end{bmatrix}F_{2N}^{-1}, \text{ and}$$

$$G_2 = F_{2N}\begin{bmatrix}I_{N\times N} & 0_{N\times N}\\ 0_{N\times N} & 0_{N\times N}\end{bmatrix}F_{2N}^{-1}.$$

The matrix $P_{X_kX_k}(m)=X_k^H(m)X_k(m)$ is a diagonal approximation of the input power spectral density matrix. To reduce the variance of the power spectrum estimate, the instantaneous power estimate may be substituted by its smoothed version, $$P_{X_kX_k}(m)=\beta P_{X_kX_k}(m-1)+(1-\beta)X_k^H(m)X_k(m),$$

where β is the smoothing term. This example also assumes a fixed step-size (how much the filter is adapted during each iteration) for each partition $\mu(m)=\mu_0 I$, however the step size may be varied in some implementations.

Example implementations of adaptive filter 872 implement cross-band filtering. To illustrate such filtering, let y[n] be the near-end measured signal, which includes the near-end speech and/or noise v[n] mixed with the acoustic echo d[n]=h[n]*x[n], where h[n] is the impulse response of the system, x[n] is the far-end reference signal, and * is the convolution operator. Let $x[m]=[x[mR],\ldots x[mR+N-1]]^T$ be the $m^{th}$ reference signal vector, $w_A=[w_A[0],\ldots,w_A[N-1]]$ be the analysis window vector, $(F)_{k+1,n+1}=w_N^{kn}$, k,n=0 . . . , N-1 be the N×N discrete Fourier transform matrix, and $\underline{x}[m]=F(w_A\circ x[m])=[X_0[m],\ldots,X_{N-1}[m]]^T$ be the DFT of the windowed reference signal vector, where ∘ is the Hadamard (element-wise) product operator and $\{\cdot\}^T$ is the transpose operator.

As noted above, passing a frame of the reference signal through the adaptive filter 872 yields a frame of a model signal. Given a transfer function H, the acoustic echo can be represented in the STFT domain as $$\underline{d}[m] = \Sigma_{i=0}^{M-1} H_i[m-1]\underline{x}[m-i],$$

where $\underline{d}[m]$ is the DFT of the $m^{th}$ frame echo signal, $H_i$ is the $i^{th}$ impulse response matrix (i.e., the filter for the $m^{th}$ iteration of the AEC 554), and M is the filter length in the STFT domain.

Given the foregoing, acoustic echo cancellation by the AEC 554 can be expressed in the STFT domain as:

$\underline{x}[m] = F (w_A \circ [x[mR], \ldots, x[mR+N-1]]^T)$, where $\underline{x}[m]$ is the reference signal, $\underline{y}[m] = F (w_A \circ [y[mR], \ldots, y[mR+N-1]]^T)$, where $\underline{y}[m]$ is the measured signal, and $\underline{e}[m] = \underline{y}[m] - \hat{\underline{d}}[m] = \underline{y}[m] - \Sigma_{i=0}^{M-1} \hat{H}_i[m-1]\underline{x}[m-i]$, where $\underline{e}[m]$ is the output signal. As noted above, the redaction function 808 redacts the model signal $\hat{\underline{d}}[m]$ from the measured signal.

When noise and/or speech are present in the measured signal, the error signal vector is given by $$\underline{e}[m] = \underline{v}[m] + \underline{d}[m] - \hat{\underline{d}}[m] = \underline{v}[m] + \underline{b}[m],$$

where $\underline{v}[m]$ and $\underline{b}[m]$ is the noise vector and the noise-free error signal vector (a.k.a., the true error signal), respectively, in the STFT domain. Since the error signal $\underline{e}[m]$ deviates from the true, noise-free, echo signal vector $\underline{b}[m]$, the adaptive filter may diverge from the optimal solution due to near-end interference (e.g., one or more second voices in a double-talk condition). Some implementations may halt or otherwise disable adaptation of the filter during such conditions to avoid introducing noise into the signal, possibly using a double-talk detector. However, such implementations have the disadvantage that acoustic echo is not effectively cancelled from the measured signal while the AEC filter is disabled (or not adapting). To tolerate significant near-end interference $\underline{v}[m]$ (e.g., double-talk), one or more robustness constraints are introduced to stabilize the filter update.

Namely, at block 876, the AEC 554 estimates the true error signal. The true error signal $\underline{b}[m]$ is the difference between the actual acoustic echo $\underline{d}[m]$ and the estimated acoustic echo $\hat{\underline{d}}[m]$ produced by the adaptive filter 872. The output signal, renamed as the error signal, which includes the audio in the room other than the acoustic echo (e.g., one or more voices) as well as the true error signal, is provided as input to block 876. Ultimately, the true error signal is used in determining an update filter at block 878, which is summed with the adaptive filter 872 to yield the adaptive filter for the next iteration.

In some examples, estimating the true error signal may involve limiting the error if it exceeds a certain magnitude threshold. Such limiting may prevent unwanted divergence in noise conditions (e.g., double talk). Limiting the error may involve error recovery non-linearity (ERN) which can express the estimated true error signal $\phi(E_k(m))$ as a non-linear clipping function:

$$\phi(E_k(m)) = \begin{cases} \frac{T_k}{|E_k|} E_k[m], & |E_k[m]| \geq T_k[m] \\ E_k[m], & \text{otherwise} \end{cases}.$$

This non-linear clipping function limits the error signal when its magnitude is above a certain threshold $T_k[m]$. This threshold is estimated based on the near-end (measured) signal statistics and is approximated by $T_k[m] = \sqrt{S_{ee,k}[m]}$ with $$S_{ee,k}[m] = E\{|E_k[m]|^2\} \approx \beta S_{ee,k}[m-1] + (1-\beta)|E_k[m]|^2,$$

where $S_{ee,k}[m]$ is the power spectral density (PSD) of the error signal, $E\{\cdot\}$ is the expectation operator, and $0 << \beta << 1$ is a forgetting factor. This non-linear clipping function is provided by way of example. Other functions may be implemented as well to estimate the true error signal.

Given the foregoing, the true error signal $\phi(E_k(m))$ can be determined as follows:

$$\underline{s}_{xx}[m] = \beta \underline{s}_{xx}[m-1] + (1-\beta)(\underline{x}[m] \circ \underline{x}*[m]),$$

$$\underline{s}_{ee}[m] = \beta \underline{s}_{ee}[m-1] + (1-\beta)(\underline{e}[m] \circ \underline{e}*[m]),$$

$$\phi(E_k(m)) = \begin{cases} \frac{\sqrt{S_{ee,k}[m]}}{|E_k|} E_k[m], & |E_k[m]| \geq \sqrt{S_{ee,k}[m]} \\ E_k[m], & \text{otherwise} \end{cases}.$$

Recall that $\underline{x}[m]$ represents the reference signal and $\underline{e}[m]$ represents the error signal, which is the measured signal with the model signal redacted.

At block 877, the normalized least mean square of the true error signal is determined. In the normalized least square algorithm, the least mean square of the error is normalized with the power of the input (e.g., the reference signal). This has the effect of varying the step size of the algorithm to make it more noise-robust.

Normalization with respect to the power of the input can be expressed as $$\underline{n}_{xx}[m] = (\underline{s}_{xx}[m] + \delta 1_{N \times 1})^{\circ(-1)},$$

where $\{\cdot\}^{\circ(-1)}$ is the Hadamard (element-wise) inverse operator, $1_{N \times 1} = [1, \ldots, 1]^T$, $\delta$ is a regularization term and $\underline{s}_{xx}[m] = E\{\underline{x}[m] \circ \underline{x}*[m]\} \equiv [S_{xx,0}[m], \ldots, S_{xx,N-1}[m]]^T$ is the PSD vector of the reference signal with $\{\cdot\}*$ being the element-wise complex conjugate operator.

In some cases, noise robustness may be further improved by applying a frequency dependent regularization term. For instance, such a term may be expressed as:

$$\delta_k[m] = \gamma \frac{S_{ee,k}^2[m]}{S_{xx,k}[m]}.$$

This term scales down the step-size automatically when the near-end (measured) signal is large, helping to keep adaption of the filter robust.

At block 878, an update filter is determined. As noted above, ultimately, the update filter is summed with the filter used in the current iteration of the AEC 554 to yield the filter for the next iteration of the AEC 554. Generally, during the first iterations of the AEC 554, some error exists in the cancellation of the echo from the measured signal. However, over successive iterations of the AEC 554, this error is diminished. In particular, during each iteration of the AEC 554, the adaptive filter 872 is updated for the next iteration based on error from the current iteration. In this way, during successive iterations of the AEC 554, the AEC 554 mathematically converges to a cancellation of the audio playback by the speakers 222 (FIG. 2). In this way, the filter adapts during a successive iteration of the AEC based on error from the previous iteration.

In the first iteration of the AEC 554, an initial filter is utilized, as no adaptation has yet occurred. In some implementations, the initial filter is a transfer function representing the acoustic coupling between speakers 222 and microphones 224. In some embodiments, the initial filter comprises a transfer function generated using measurements performed in an anechoic chamber. The generated transfer function can represent an acoustic coupling between the speakers 222 and the microphones 224 without any room effect. Such an initial filter could be used in any acoustic environment. Alternatively, in an effort to start the adaptive filter in a state that more closely matches the actual acoustic environment in which the playback device is located, a transfer function representing an acoustic coupling between the speakers 222 and the microphones 224 may be determined during a calibration procedure that involves microphones 224 recording audio output by speakers 222 in a quiet room (e.g., with minimal noise). Other initial filters may be used as well, although a filter that poorly represents the acoustic coupling between the speakers 222 and the microphones 224 may provide a less optimal starting point for the AEC 554 and result in convergence requiring additional iterations of the AEC 554.

In subsequent iterations of the AEC, the adaptive filter 872 can continue to adapt. During each $n^{th}$ iteration of the AEC, an $n+1^{th}$ instance of the adaptive filter 806 is determined for the next iteration of the AEC. In particular, during the $n^{th}$ iteration of the AEC 554, the $n^{th}$ instance of the adaptive filter 872 is summed with an $n^{th}$ update filter to yield the $n+1^{th}$ instance of the adaptive filter 872. The $n^{th}$ update filter is based on the modelling error of the filter during the $n^{th}$ iteration.

To illustrate, let $\hat{H}$ be an adaptive filter matrix. For a filter having K blocks, to improve the modeling accuracy, 2K cross-terms, or 2K off-diagonal bands are added around the main diagonal terms of H without increasing the computational complexity to an impractical extent. Recall that K In this example, $\hat{H}$ has 2K+1 diagonal bands. The model signal (i.e., the estimated acoustic echo) can be written as $$\hat{d}[=m]=\Sigma_{i=0}^{M-1}\hat{H}_i[m-1]\underline{x}[m-i],$$

and the adaptive filter matrix can be updated from iteration to iteration using $$\hat{H}_i[m]=\hat{H}_i[m-1]+G\circ\Delta\hat{H}_i[m], i=0,\ldots M-1,$$

where $\Delta\hat{H}_i[m]$ is an update matrix for the filter coefficients matrix and $G=\Sigma_{k=-K}^{K}P^k$ is a matrix that selects the 2K+1 diagonal bands. P is a permutation matrix defined as $$P \equiv \begin{bmatrix} 0 & \cdots & & \cdots & 0 & 1 \\ 1 & \ddots & & & \vdots & 0 & 0 \\ 0 & \ddots & \ddots & & & \vdots & \vdots \\ \vdots & & \ddots & \ddots & & 0 & 0 \\ 0 & \cdots & & & 0 & 1 & 0 \end{bmatrix}.$$

The matrix G limits the number of crossband filters that are useful for system identification in the STFT domain since increasing the number of crossband filters does not necessarily lead to a lower steady-state error.

As noted above, the $n^{th}$ update filter is based on the modelling error of the filter during the $n^{th}$ iteration. Using a least mean squares algorithm, the update filter is given by $$\hat{H}_i^{LMS}[m]\mu\underline{e}[m]\underline{x}^H[m-i]$$

where $\underline{e}[m]=\underline{y}[m]-\underline{\hat{d}}[m]$ is the error signal vector in the STFT domain, $\mu>0$ is a step-size, and $\{\bullet\}H$ is the Hermitian transpose operator. As compared with FDAD-type algorithms, this update filter takes into account the contribution of the cross-frequency components of the reference signal without relying on the DFT and IDFT for cancelling the aliased components, which allows for a simplified processing pipeline with less complexity.

As noted above, as an alternative to the least mean squares, a normalized least mean squares algorithm may be implemented to improve noise-robustness. Using the NMLS from block 818, the update filter is given by:

$$\Delta\hat{H}_i^{NLMS}[m]=\mu\underline{e}[m](\underline{n}[m]\circ\underline{x}[m-1])^H,$$

where the reference signal is normalized by its signal power before being multiplied by the error signal in block 818. Note that each element of the NLMS update matrix is given as:

$$\left(\Delta\hat{H}_i^{NLMS}[m]\right)_{k+1,l+1} = \mu\frac{\phi(E_k[m])X_l^*[m-1]}{S_{xx,l}[m]+\delta}.$$

In implementations in which the cross-frequency dependent regularization term is utilized, then then the NMLS update matrix is given by:

$$\left(\Delta\hat{H}_i^{NLMS}[m]\right)_{k+1,l+1} = \mu\frac{\phi(E_k[m])X_l^*[m-1]}{S_{xx,l}[m]+\delta}.$$

Given the foregoing, a noise-robust adaptive step size for the AEC can be expressed in matrix form as:

$$(M[m])_{k+1,l+1} = \frac{S_{xx,l}[m]}{S_{xx,l}^2[m]+\gamma S_{ee,k}^2[m]}.$$

Then the update matrix is given as:

$$\Delta\hat{H}_i[m]=\mu\underline{M}[m]\circ(\phi(\underline{e}[m])\underline{x}^H[m-1]), i=0,\ldots,M-1$$

where $\phi(\underline{e}[m])\equiv[\phi(E_0[m]),\ldots,\phi(E_{N-1}[m-1])]^T$ is the estimate of the true error signal vector after applying ERN.

As noted above, particular, during the $n^{th}$ iteration of the AEC 554, the $n^{th}$ instance of the adaptive filter 872 is summed with an $n^{th}$ update filter to yield the $n+1^{th}$ instance of the adaptive filter 872. Given the example above, the adaptive filter is represented as:

$$\hat{H}_i[m]=\hat{H}_i[m-1]+G\circ\Delta\hat{H}_i[m], i=0,\ldots,M-1$$

At block 879, a sparsity criterion is applied to the output of the update filter 878. A sparsity criterion may deactivate inactive portions of the filter. This allows use of a high order multi delay filter where only the partitions that correspond to the actual model are active, thereby reducing computation requirements. Although FIG. 8A suggests that the sparsity criterion is applied after determination of the update filter 879, the sparsity criterion may be applied either before or after the update filter.

The sparsity criterion may be implemented as a thresholding operator:

$$T_\varepsilon(h_j) = \begin{cases} 0, & \|h_j\|_1 \leq \varepsilon_j \\ h_j, & \|h_j\|_1 > \varepsilon_j \end{cases},$$

which distinguishes between active and inactive partitions. Within examples, $\varepsilon_j$ is in the order of the estimated noise level normalized for the block length. $T_\varepsilon(h_j)$ attempts to solve $$h_j(m) \in \mathbb{R}_{B_j N}^{min} \|e_j(m)\|_2^2 + \gamma_j \|h_j(m)\|_1.$$

where $\gamma_j$ controls the sparsity of the $j^{th}$ filter. In some examples, the thresholding operator can be applied to the filter update step of the NMLS algorithm, which then becomes:

$$\forall j: \hat{h}_j(m) = T_\varepsilon(\hat{h}_j(m-1) + G_{2_j}\mu_0(m)\nabla \hat{h}_j(m)).$$

Applying the sparsity constraint during each iteration of the AEC results in a Landweber iteration with thresholding, which contributes to the noise robustness of the AEC.

In example implementations, acoustic echo cancellation pipeline 800a may be integrated into an audio processing pipeline that includes additional audio processing of microphone-captured audio such as beam forming, blind source separation, and frequency gating before the microphone-captured audio is processed as a voice input to a voice service.

Figure 8B:
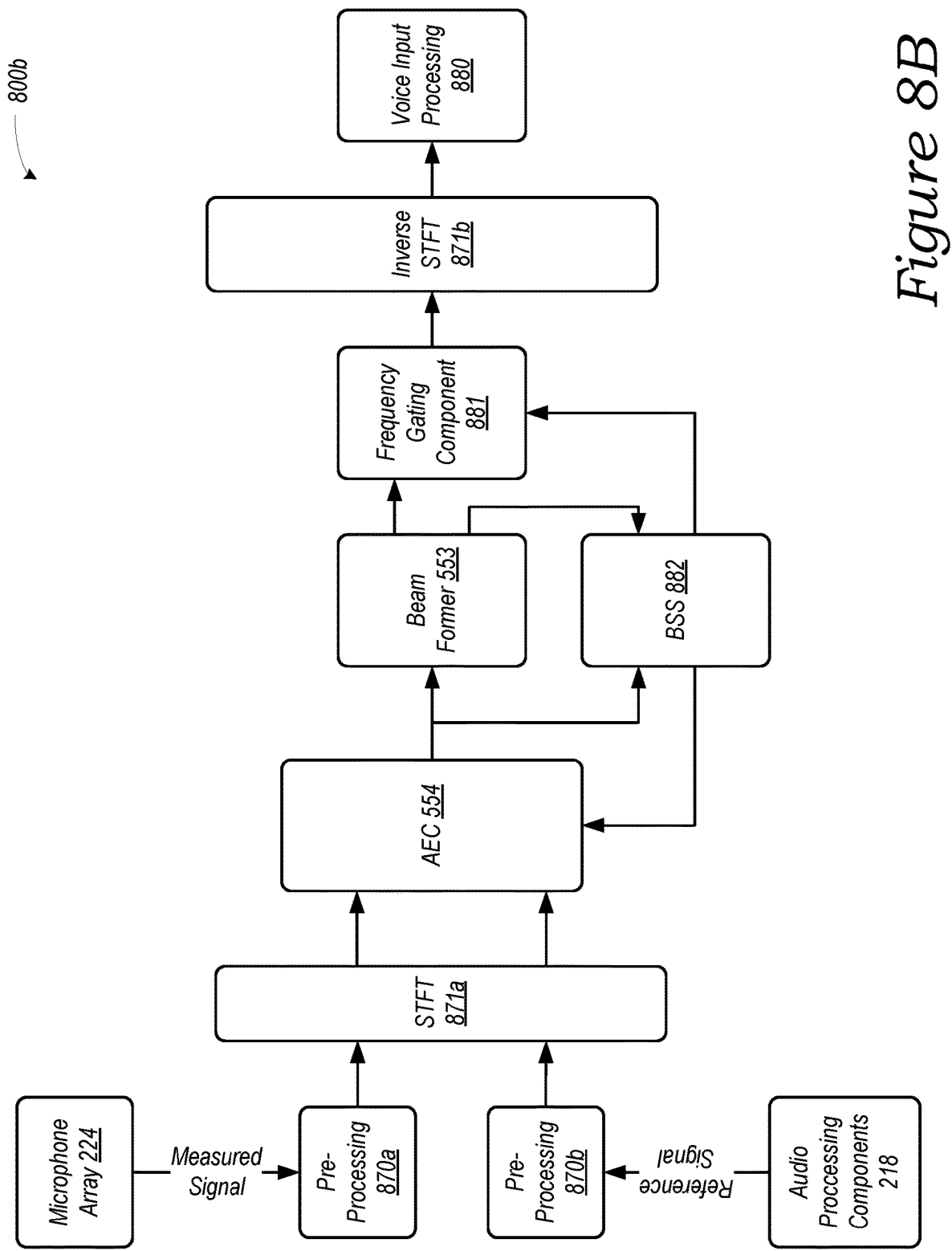
FIG. 8B is a functional block diagram of an example acoustic echo cancellation pipeline.

FIG. 8B is a functional block diagram of an audio processing pipeline 800b that integrates acoustic echo cancellation pipeline 800a. As shown in FIG. 8B, other voice processing functions such as beamforming (via the beam former 553), blind signal separation (via the blind signal separator 882), and frequency gating (via the frequency gating component 881) are performed in the STFT domain using the AEC signals. By performing these functions in conjunction with AEC in the STFT domain, the overall audio processing pipeline can be less complex than conventional AEC approaches as fewer applications of the DFT and inverse DFT are involved, reducing the overall computational complexity of the audio processing pipeline.

IV. Example Acoustic Echo Cancellation

Figure 9:
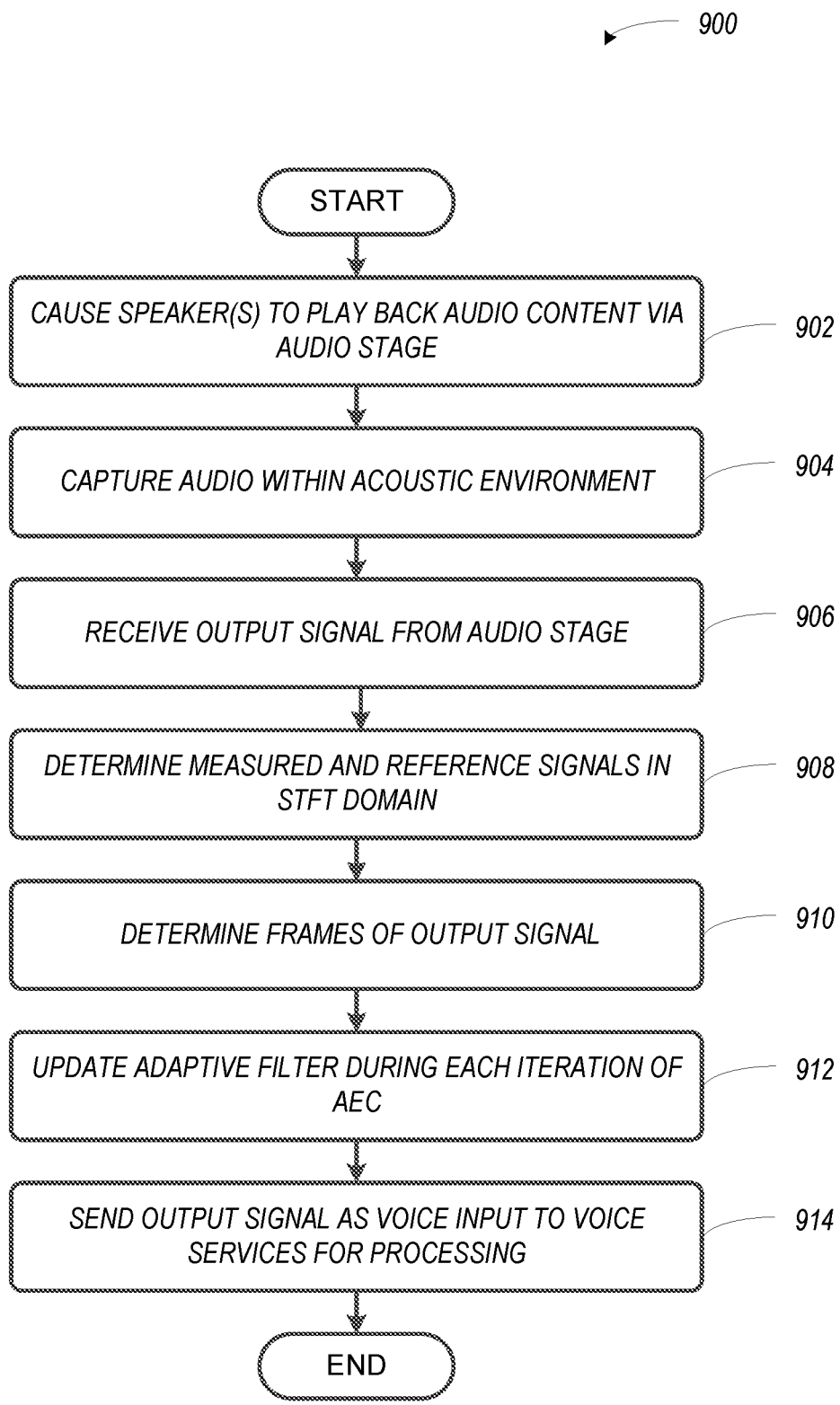
FIG. 9 is a flow diagram of a method of performing acoustic echo cancellation.

As discussed above, embodiments described herein may involve acoustic echo cancellation. FIG. 9 is a flow diagram of an example implementation 900 by which a system (e.g., the playback device 102, the NMD 103, and/or the control device 104) may perform noise-robust acoustic echo cancellation in the STFT domain. In some embodiments, the implementation 900 can comprise instructions stored on a memory (e.g., the memory 216 and/or the memory 316) and executable by one or more processors (e.g., the processor 212 and/or the processor 312).

a. Causing One or More Speakers to Play Back Audio Content

At block 902, the implementation 900 causes one or more speakers to play back audio content. For instance, the implementation 900 can be configured to cause a playback device (e.g., the playback device 102 of FIG. 2) to play back audio content via one or more speakers (e.g., the speakers 222). Example audio content includes audio tracks, audio with video (e.g., home theatre), streaming audio content, and many others. Prior to playback, the playback device may process and/or amplify the audio content via an audio stage, which may include audio processing components (e.g., the audio processing components 218 of FIG. 2) and/or one or more audio amplifiers (e.g., the audio amplifiers 220 of FIG. 2).

As noted above, the audio content may be designed for playback by the playback device 102 by another device. For instance, a controller device (e.g., the controller devices 103a and/or 103b of FIG. 1, the control device 104 of FIG. 3) may instruct a playback device to play back certain audio content by causing that content to be placed in a playback queue of the playback device. Placing an audio track or other audio content into such a queue can cause the playback device to retrieve the audio content after playback is initiated via a control on the controller device 104 and/or on the playback device 102 itself (e.g., via a Play/Pause button).

b. Capture Audio within Acoustic Environment

At block 904, the implementation 900 captures audio within the acoustic environment. For instance, the implementation 900 can be configures to capture audio within an acoustic environment via an NMD (e.g., the NMD 103 of FIG. 2) having one or more microphones (e.g., two or more microphones of microphone array 224). Capturing audio may involve recording audio within an acoustic environment and/or processing of the recorded audio (e.g., analog-to-digital conversation).

In some embodiments, the implementation 900 is configured to capture audio within an acoustic environment while one or more playback devices are also playing back audio content within the acoustic environment. The captured audio can include, for example, audio signals representing acoustic echoes caused by playback of the audio content in the acoustic environment. The captured audio may also include audio signals representing speech (e.g., voice input to a voice assistant service or other speech such as conversation) as well as other sounds or noise present in the acoustic environment.

c. Receive Output Signal from Audio Stage

At block 906, the implementation 900 receives an output signal from the audio stage. For instance, the implementation 900 can be configured to receive an output signal from the audio stage of the playback device 200. As described above in reference to FIG. 8A, the output signal can represent audio content played back by the playback device 200. Ultimately, the output signal becomes a reference signal for acoustic echo cancellation. Accordingly, within examples, the output signal is routed from a point in the audio pipeline of the playback device that closely represents the actual output produced by the speakers 224 of the playback device 200. Since each stage of an audio processing pipeline may introduce its own artifacts, the point in the audio processing pipeline that closely represents the expected analog audio output of the speakers is typically near the end of the pipeline.

In some embodiments, the implementation 900 is configured to receive the output signal internally from the audio pipeline such as, for example, when an NMD in is consolidated in a playback device (e.g., as with NMD 103 of playback device 102 shown in FIG. 2). In other embodiments, however, the implementation 900 is configured to receive the output signal via an input interface, such as a network interface (e.g., network interface 230) or a line-in interface, among other examples.

d. Determine Measured and Referenced Signals in STFT Domain

At block 908, the implementation 900 is configured to determine measured and reference signals in an STFT domain. For instance, the system may determine a measured signal based on the captured audio and a reference signal based on the output signal from the audio stage of the playback device.

Determining the measured signal may involve processing and/or conditioning of the captured audio prior to acoustic echo cancellation. As described above in reference to FIGS. 8A and 8B, acoustic echo cancellation in the STFT domain may occur on a frame-by-frame basis, with each frame including a series of samples (e.g., 16 ms of samples). As such the measured signal may include a series of frames representing the captured audio within the acoustic environment. Frames of the captured audio may be pre-processed (e.g., as described with respect to block 870a of FIG. 8A) and then converted into the STFT domain (e.g., as described with respect to block 871a of FIG. 8A) to yield a measured signal for input to an AEC (e.g., AEC 554).

Determining the reference signal may involve similarly involve processing and/or conditioning prior to AEC. Like the measured signal, the output signal from the audio stage may be divided into a series of frames representing portions of a reference signal. Frames of the output signal may be pre-processed (e.g., as described with respect to block 870b of FIG. 8A) and then converted into the STFT domain (e.g., as described with respect to block 871a of FIG. 8A) to yield a reference signal for input to an AEC (e.g., AEC 554).

e. Determine Frames of Output Signal

At block 910, the implementation 900 is configured to determine frames of an output signal from an AEC. In some embodiments, for example, the implementation 900 comprises an AEC (such as the AEC 554 of FIGS. 8A and 8B) configured to determine frames of an output signal during each iteration of the AEC. As described above with respect to FIG. 8A, during each $n^{th}$ iteration of AEC 554, an $n^{th}$ frame of the reference signal through an $n^{th}$ instance of adaptive filter 872 yielding an $n^{th}$ frame of a model signal. Then the $n^{th}$ frame of the output signal is generated by redacting the $n^{th}$ frame of the model signal from the $n^{th}$ frame of the measured signal (e.g., using redaction function 808).

As further described above, an output signal $\underline{e}[m]$ can be defined in example implementations as $$\underline{e}[m]=\underline{y}[m]-\hat{\underline{d}}[m]=\underline{y}[m]-\Sigma_{i=0}^{M-1}\hat{H}_i[m-1]\underline{x}[m-i],$$

where the reference signal $\underline{x}[m]=F(w_A \circ [x[mR], \ldots, x[mR+N-1]]^T)$ and the measured signal $\underline{y}[m]=F(w_A \circ [y[mR], \ldots, y[mR+N-1]]^T)$.

f. Update Adaptive Filter During Each Iteration of AEC

At block 912, the implementation 900 is configured to update the adaptive filter during one or more iterations of the AEC as described, for example, with reference to AEC 554 in FIG. 8A. Recall that, during each $n^{th}$ iteration, an $n^{th}$ update matrix is determined based on a "true" error signal representing a difference between the $n^{th}$ frame of the model signal and the $n^{th}$ frame of the reference signal less audio signals representing sound from sources other than an $n^{th}$ frame of the audio signals representing sound produced by the one or more speakers in playing back the $n^{th}$ frame of the reference signal. This error signal can be referred to as the true error signal and can be determined using an ERN function that limits the error signal to a threshold magnitude, as described with respect to block 876 in FIG. 8A. The $n+1^{th}$ instance of the adaptive filter for the next iteration of the AEC 554 is generated by summing the $n^{th}$ instance of the adaptive filter with the $n^{th}$ update filter.

In an effort to increase robustness of the AEC 554 in view of significant noise, the adaptive filter may adapt according to an NMLS algorithm. Under such an algorithm, the true error signal may be normalized according to the power of the input (e.g., the reference signal), as described in block 877 of FIG. 8A. Further, AEC 554 may apply a sparse partition criterion that deactivates inactive portions of the adaptive filter (e.g., zeroes out frequency bands of the NMLS having less than a threshold energy), as described in block 879 for instance. Further, AEC 554 may apply a frequency-dependent regularization parameter to adapt an NMLS learning rate of change between AEC iterations according to a magnitude of the measured signal, as described in block 878 of FIG. 8A.

Given such features, the AEC may convert the sparse NMLS of the $n^{th}$ frame of the error signal to the $n^{th}$ update filter. Such conversion may involve converting the sparse NMLS of the $n^{th}$ frame to a matrix of filter coefficients and cross-band filtering the matrix of filter coefficients to generate the $n^{th}$ update filter, as described with respect to block 878 of FIG. 8A.

g. Send Output Signal as Voice Input to Voice Service(s) for Processing

At block 914, the implementation 900 is configured to send the output signal as a voice input to one or more voice services for processing of the voice input. In some embodiments, the implementation 900 processes the output signal as a voice input as described with respect to FIGS. 5A and 5B. Such processing may involve detecting one or more wake words and one or more utterances. Further, such processing may involve voice-to-speech conversion of the voice utterances, and transmitting the voice utterances to a voice assistant service with a respect to process the utterance as a voice input. Such transmitting may occur via a network interface, such as network interface 230.

V. Conclusion

The description above discloses, among other things, various example systems, methods, apparatus, and articles of manufacture including, among other components, firmware and/or software executed on hardware. In one embodiment, for example, a playback device (playback device 102) and/or a network microphone device (network microphone device 103) is configured to perform acoustic echo cancellation in an acoustic environment (e.g., via implementation 900). It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method to be performed by a system, the method comprising causing, via an audio stage, the one or more speakers to play back audio content; while audio content is playing back via the one or more speakers, capturing, via the one or more microphones, audio within an acoustic environment, wherein the captured audio comprises audio signals representing sound produced by the one or more speakers in playing back the audio content; receiving an output signal from the audio stage representing the audio content being played back by the one or more speakers; determining a measured signal comprising a series of frames representing the captured audio within the acoustic environment by transforming into a short time Fourier transform (STFT) domain the captured audio within the acoustic environment; determining a reference signal comprising a series of frames representing the audio content being played back via the one or more speakers by transforming into the STFT domain the received output signal from the audio stage; during each $n^{th}$ iteration of an acoustic echo canceller (AEC): determining an $n^{th}$ frame of an output signal, wherein determining the $n^{th}$ frame of the output signal comprises: generating an $n^{th}$ frame of a model signal by passing an nm frame of the reference signal through an $n^{th}$ instance of an adaptive filter, wherein the first instance of the adaptive filter is an initial filter; and generating the $n^{th}$ frame of the output signal by redacting the $n^{th}$ frame of the model signal from an $n^{th}$ frame of the measured signal; determining a $n+1^{th}$ instance of the adaptive filter for a next iteration of the AEC, wherein determining the $n+1^{th}$ instance of the adaptive filter for the next iteration of the AEC comprises: determining an $n^{th}$ frame of an error signal, the $n^{th}$ frame of the error signal representing a difference between the $n^{th}$ frame of the model signal and the $n^{th}$ frame of the reference signal less audio signals representing sound from sources other than an $n^{th}$ frame of the audio signals representing sound produced by the one or more speakers in playing back the $n^{th}$ frame of the reference signal; determining a normalized least mean square (NMLS) of the $n^{th}$ frame of the error signal; determining a sparse NMLS of the $n^{th}$ frame of the error signal by applying to the NMLS of the $n^{th}$ frame of the error signal, a sparse partition criterion that zeroes out frequency bands of the NMLS having less than a threshold energy; converting the sparse NMLS of the $n^{th}$ frame of the error signal to an $n^{th}$ update filter; and generating the $n+1^{th}$ instance of the adaptive filter for the next iteration of the AEC by summing the $n^{th}$ instance of the adaptive filter with the $n^{th}$ update filter; and sending the output signal as a voice input to one or more voice services for processing of the voice input.

(Feature 2) The method of feature 1, further comprising before determining the NMLS of the $n^{th}$ frame of the error signal, applying an error recovery non-linearity function to the error signal to limit the error signal to a threshold magnitude, wherein determining the normalized least mean square (NMLS) of the $n^{th}$ frame of the error signal comprises determining the NMLS of the $n^{th}$ frame of the limited error signal.

(Feature 3) The method of feature 2, wherein the error recovery non-linearity function comprises a non-linear clipping function that limits portions of the error signal that are above the threshold magnitude to the threshold magnitude.

(Feature 4) The method of feature 1, wherein determining the normalized least mean square (NMLS) of the $n^{th}$ frame of the error signal comprises: applying a frequency-dependent regularization parameter to adapt an NMLS learning rate of change between AEC iterations according to a magnitude of the measured signal.

(Feature 5) The method of feature 1, wherein converting the sparse NMLS of the $n^{th}$ frame of the error signal to the $n^{th}$ update filter comprises: converting the sparse NMLS of the $n^{th}$ frame to a matrix of filter coefficients; and cross-band filtering the matrix of filter coefficients to generate the $n^{th}$ update filter.

(Feature 6) The method of feature 1, wherein the system excludes a double-talk detector that disables the AEC when a double-talk condition is detected, wherein capturing audio within the acoustic environment comprises capturing audio signals representing sound produced by two or more voices.

(Feature 7) The method of feature 1, wherein the system comprises a playback device comprising a first network interface and the one or more speakers; and a networked-microphone device comprising a second network interface, the one or more microphones, the one or more processors, and the data storage storing instructions executable by the one or more processors, wherein the first network interface and the second network interface are configured to communicatively couple the playback device and the networked-microphone device.

(Feature 8) The method of feature 1, wherein the system comprises a playback device comprising a housing configured to house the one or more speakers and the one or more microphones.

(Feature 9) A tangible, non-transitory computer-readable medium having stored therein instructions executable by one or more processors to cause a device to perform the method of any of features 1-8.

(Feature 10) A device configured to perform the method of any of features 1-8.

(Feature 11) A media playback system configured to perform the method of any of features 1-8.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:
1. A system comprising:
at least one playback device comprising at least one headphone, at least one microphone and one or more audio transducers;
a mobile device;
one or more wireless network interfaces;
at least one processor; and
data storage storing program instructions that are executable by the at least one processor to cause the system to perform functions comprising:
playing back at least one audio signal via the one or more audio transducers of the at least one playback device;
while playing back the at least one audio signal, capturing, via the at least one microphone, audio, wherein at least a portion of the captured audio represents sound produced by the one or more audio transducers in playing back the at least one audio signal;
transforming into a short time Fourier transform (STFT) domain the captured audio to generate a measured signal representing actual acoustic echo;
transforming into the STFT domain the at least one audio signal being played back by the at least one playback device to generate a reference signal;

during each $n^{th}$ iteration of an acoustic echo canceller (AEC):
    determining an $n^{th}$ frame of an output signal, wherein determining the $n^{th}$ frame of the output signal comprises:
        (i) generating an $n^{th}$ frame of a model signal representing estimated acoustic echo by passing an $n^{th}$ frame of the reference signal through an $n^{th}$ instance of an adaptive filter; and
        (ii) generating the $n^{th}$ frame of the output signal by differencing the $n^{th}$ frame of the model signal and an $n^{th}$ frame of the measured signal;
    determining a $n+1^{th}$ instance of the adaptive filter for a next iteration of the AEC, wherein determining the $n+1^{th}$ instance of the adaptive filter for the next iteration of the AEC comprises:
        (i) estimating an $n^{th}$ frame of an error signal, the $n^{th}$ frame of the error signal representing a difference between the $n^{th}$ frame of the measured signal and the $n^{th}$ frame of the model signal;
        (ii) converting the $n^{th}$ frame of an error signal to an $n^{th}$ update filter;
        (iii) deactivating inactive portions of the $n^{th}$ update filter, the inactive portions having less than a threshold energy; and
        (iv) generating the $n+1^{th}$ instance of the adaptive filter for the next iteration of the AEC by summing the $n^{th}$ instance of the adaptive filter with the $n^{th}$ update filter; and
    sending, via the one or more wireless network interfaces, the output signal as a voice input to one or more voice assistants for processing of the voice input.

2. The system of claim 1, wherein the at least one headphone comprises wireless headphones, wherein the one or more audio transducers comprise a first audio transducer and a second audio transducer of the wireless headphones, and wherein the at least one audio signal comprises a first audio channel and a second audio channel, and wherein playing back the at least one audio signal comprises:
    playing back the first audio channel via the first audio transducer; and
    playing back the second audio channel via the second audio transducer.

3. The system of claim 1, wherein the at least one playback device comprises a first playback device and a second playback device configured in a bonded configuration, wherein the one or more audio transducers comprise a first audio transducer and a second audio transducer, and wherein the at least one audio signal comprises a first audio channel and a second audio channel, and wherein playing back at least one audio signal comprises:
    playing back the first audio channel via the first audio transducer; and
    playing back the second audio channel via the second audio transducer.

4. The system of claim 1, wherein the mobile device comprises the AEC, and wherein the functions further comprise:
    sending, via the one or more wireless network interfaces to the mobile device, data representing the captured audio.

5. The system of claim 1, wherein the one or more wireless network interfaces comprise an 802.15-compatible wireless network interface, and wherein the functions further comprise:
    sending, via the 802.15-compatible wireless network interface to the at least one playback device, data representing the at least one audio signal.

6. The system of claim 1, wherein converting the $n^{th}$ frame of an error signal to the $n^{th}$ update filter comprises determining a normalized least mean square (NMLS) of the $n^{th}$ frame of the error signal, and wherein deactivating the inactive portions of the $n^{th}$ update filter comprises determining a sparse NMLS of the $n^{th}$ frame of the error signal by applying to the NMLS of the $n^{th}$ frame of the error signal, a sparse partition criterion that zeroes out frequency bands of the NMLS having less than the threshold energy.

7. The system of claim 6, wherein determining the normalized least mean square (NMLS) of the $n^{th}$ frame of the error signal comprises applying a frequency-dependent regularization parameter to adapt an NMLS learning rate of change between AEC iterations according to a magnitude of the measured signal.

8. The system of claim 6, wherein converting the sparse NMLS of the $n^{th}$ frame of the error signal to the $n^{th}$ update filter comprises:
    converting the sparse NMLS of the $n^{th}$ frame to a matrix of filter coefficients; and
    cross-band filtering the matrix of filter coefficients to generate the $n^{th}$ update filter.

9. The system of claim 6, wherein the data storage further comprises program instructions that are executable by the at least one processor such that the system is configured to perform functions further comprising:
    before determining the NMLS of the $n^{th}$ frame of the error signal, applying an error recovery non-linearity function to the error signal to limit the error signal to a threshold magnitude, wherein determining the normalized least mean square (NMLS) of the $n^{th}$ frame of the error signal comprises determining the NMLS of the $n^{th}$ frame of the limited error signal.

10. The system of claim 9, wherein the error recovery non-linearity function comprises a non-linear clipping function that limits portions of the error signal that are above the threshold magnitude to the threshold magnitude.

11. A mobile device comprising:
    one or more wireless network interfaces;
    at least one processor; and
    data storage storing program instructions that are executable by the at least one processor to cause the mobile device to perform functions comprising:
        causing at least one playback device to play back at least one audio signal via one or more audio transducers of the at least one playback device, wherein the at least one playback device comprises at least one headphone;
        while the at least one playback device is playing back the at least one audio signal, receiving audio captured via at least one microphone of the at least one playback device, wherein at least a portion of the captured audio represents sound produced by one or more audio transducers of the at least one playback device in playing back the at least one audio signal;
        transforming into a short time Fourier transform (STFT) domain the captured audio to generate a measured signal representing actual acoustic echo;
        transforming into the STFT domain the at least one audio signal being played back by the at least one playback device to generate a reference signal;

during each $n^{th}$ iteration of an acoustic echo canceller (AEC):
    determining an $n^{th}$ frame of an output signal, wherein determining the $n^{th}$ frame of the output signal comprises:
        (i) generating an $n^{th}$ frame of a model signal representing estimated acoustic echo by passing an $n^{th}$ frame of the reference signal through an $n^{th}$ instance of an adaptive filter; and
        (ii) generating the $n^{th}$ frame of the output signal by differencing the $n^{th}$ frame of the model signal and an $n^{th}$ frame of the measured signal;
    determining a $n+1^{th}$ instance of the adaptive filter for a next iteration of the AEC, wherein determining the $n+1^{th}$ instance of the adaptive filter for the next iteration of the AEC comprises:
        (i) estimating an $n^{th}$ frame of an error signal, the $n^{th}$ frame of the error signal representing a difference between the $n^{th}$ frame of the measured signal and the $n^{th}$ frame of the model signal;
        (ii) converting the $n^{th}$ frame of an error signal to an $n^{th}$ update filter;
        (iii) deactivating inactive portions of the $n^{th}$ update filter, the inactive portions having less than a threshold energy; and
        (iv) generating the $n+1^{th}$ instance of the adaptive filter for the next iteration of the AEC by summing the $n^{th}$ instance of the adaptive filter with the $n^{th}$ update filter; and
    sending, via the one or more wireless network interfaces, the output signal as a voice input to one or more voice assistants for processing of the voice input.

12. The mobile device of claim 11, wherein the at least one headphone comprise wireless headphones, wherein the one or more audio transducers comprise a first audio transducer and a second audio transducer of the wireless headphones, and wherein causing the at least one playback device to play back the at least one audio signal comprises:
    causing the wireless headphones to play back the at least one audio signal via at the first audio transducer and the second audio transducer.

13. The mobile device of claim 11, wherein the at least one playback device comprises a first playback device and a second playback device configured in a bonded configuration, wherein the one or more audio transducers comprise a first audio transducer and a second audio transducer, and wherein the at least one audio signal comprises a first audio channel and a second audio channel, and wherein playing back the at least one audio signal comprises:
    causing the first playback device to play back the first audio channel via the first audio transducer; and
    causing the second playback device to play back the second audio channel via the second audio transducer.

14. The mobile device of claim 11, wherein the one or more wireless network interfaces comprise an 802.15-compatible wireless network interface, and wherein the functions further comprise:
    sending, via the 802.15-compatible wireless network interface to the at least one playback device, data representing the at least one audio signal.

15. The mobile device of claim 11, wherein converting the $n^{th}$ frame of an error signal to the $n^{th}$ update filter comprises determining a normalized least mean square (NMLS) of the $n^{th}$ frame of the error signal, and wherein deactivating inactive portions of the $n^{th}$ update filter comprises determining a sparse NMLS of the $n^{th}$ frame of the error signal by applying to the NMLS of the $n^{th}$ frame of the error signal, a sparse partition criterion that zeroes out frequency bands of the NMLS having less than the threshold energy.

16. The mobile device of claim 15, wherein determining the normalized least mean square (NMLS) of the $n^{th}$ frame of the error signal comprises applying a frequency-dependent regularization parameter to adapt an NMLS learning rate of change between AEC iterations according to a magnitude of the measured signal.

17. The mobile device of claim 15, wherein converting the sparse NMLS of the $n^{th}$ frame of the error signal to the $n^{th}$ update filter comprises:
    converting the sparse NMLS of the $n^{th}$ frame to a matrix of filter coefficients; and
    cross-band filtering the matrix of filter coefficients to generate the $n^{th}$ update filter.

18. The mobile device of claim 15, wherein the data storage further comprises program instructions that are executable by the at least one processor such that the mobile device is configured to perform functions further comprising:
    before determining the NMLS of the $n^{th}$ frame of the error signal, applying an error recovery non-linearity function to the error signal to limit the error signal to a threshold magnitude, wherein determining the normalized least mean square (NMLS) of the $n^{th}$ frame of the error signal comprises determining the NMLS of the $n^{th}$ frame of the limited error signal.

19. The mobile device of claim 18, wherein the error recovery non-linearity function comprises a non-linear clipping function that limits portions of the error signal that are above the threshold magnitude to the threshold magnitude.

20. At least one non-transitory computer-readable medium comprising program instructions that are executable by at least one processor such that a system is configured to perform functions comprising:
    causing at least one playback device to play back at least one audio signal via one or more audio transducers of the at least one playback device, wherein the at least one playback device comprises at least one headphone;
    while the at least one playback device is playing back the at least one audio signal, receiving audio captured via at least one microphone of the at least one playback device, wherein at least a portion of the captured audio represents sound produced by the one or more audio transducers of the at least one playback device in playing back the at least one audio signal;
    transforming into a short time Fourier transform (STFT) domain the captured audio to generate a measured signal representing actual acoustic echo;
    transforming into the STFT domain the at least one audio signal being played back by the at least one playback device to generate a reference signal;
    during each $n^{th}$ iteration of an acoustic echo canceller (AEC):
        determining an $n^{th}$ frame of an output signal, wherein determining the $n^{th}$ frame of the output signal comprises:
            (i) generating an $n^{th}$ frame of a model signal representing estimated acoustic echo by passing an $n^{th}$ frame of the reference signal through an $n^{th}$ instance of an adaptive filter; and
            (ii) generating the $n^{th}$ frame of the output signal by differencing the $n^{th}$ frame of the model signal and an $n^{th}$ frame of the measured signal;

determining a n+1$^{th}$ instance of the adaptive filter for a next iteration of the AEC, wherein determining the n+1$^{th}$ instance of the adaptive filter for the next iteration of the AEC comprises:
  (i) estimating an n$^{th}$ frame of an error signal, the n$^{th}$ frame of the error signal representing a difference between the n$^{th}$ frame of the measured signal and the n$^{th}$ frame of the model signal;
  (ii) converting the n$^{th}$ frame of an error signal to an n$^{th}$ update filter;
  (iii) deactivating inactive portions of the n$^{th}$ update filter, the inactive portions having less than a threshold energy; and
  (iv) generating the n+1$^{th}$ instance of the adaptive filter for the next iteration of the AEC by summing the n$^{th}$ instance of the adaptive filter with the n$^{th}$ update filter; and
sending, via one or more wireless network interfaces, the output signal as a voice input to one or more voice assistants for processing of the voice input.

* * * * *